(12) United States Patent
Takama et al.

(10) Patent No.: US 8,558,974 B2
(45) Date of Patent: Oct. 15, 2013

(54) LIQUID CRYSTAL DISPLAY APPARATUS

(75) Inventors: Daisuke Takama, Kanagawa (JP);
Naoyuki Itakura, Kanagawa (JP);
Takayuki Nakanishi, Aichi (JP);
Yoshiharu Nakajima, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 289 days.

(21) Appl. No.: 12/929,815

(22) Filed: Feb. 17, 2011

(65) Prior Publication Data

US 2011/0141408 A1 Jun. 16, 2011

Related U.S. Application Data

(63) Continuation of application No. 12/230,155, filed on Aug. 25, 2008, now Pat. No. 7,973,863.

(30) Foreign Application Priority Data

Sep. 7, 2007 (JP) ................................. 2007-232769

(51) Int. Cl.
*G02F 1/135* (2006.01)
*G02F 1/1335* (2006.01)

(52) U.S. Cl.
USPC ............................................. 349/96; 349/29

(58) Field of Classification Search
USPC ..................................................... 349/96, 29
See application file for complete search history.

(56) References Cited

U.S. PATENT DOCUMENTS

| | | | |
|---|---|---|---|
| 5,798,744 A | 8/1998 | Tanaka et al. | |
| 5,875,013 A * | 2/1999 | Hiroshi | 349/110 |
| 6,108,066 A * | 8/2000 | Yanagawa et al. | 349/141 |
| 6,600,541 B2 * | 7/2003 | Kurahashi et al. | 349/141 |
| 6,714,276 B2 * | 3/2004 | Yamada et al. | 349/180 |
| 6,784,956 B2 * | 8/2004 | Matsumoto et al. | 349/110 |
| 6,801,293 B1 * | 10/2004 | Nishiyama et al. | 349/187 |
| 6,952,246 B2 * | 10/2005 | Matsumoto et al. | 349/110 |
| 7,251,006 B2 * | 7/2007 | Ono et al. | 349/141 |
| 7,724,326 B2 * | 5/2010 | Kitoh et al. | 349/111 |
| 2002/0008800 A1 * | 1/2002 | Matsumoto et al. | 349/44 |
| 2002/0051101 A1 * | 5/2002 | Kurahashi et al. | 349/43 |
| 2002/0191132 A1 * | 12/2002 | Inada | 349/113 |
| 2003/0086037 A1 * | 5/2003 | Sekiguchi | 349/113 |
| 2004/0114081 A1 * | 6/2004 | Sawasaki et al. | 349/123 |
| 2004/0263711 A1 * | 12/2004 | Matsumoto et al. | 349/44 |
| 2005/0041002 A1 * | 2/2005 | Takahara et al. | 345/76 |
| 2005/0078262 A1 * | 4/2005 | Ono et al. | 349/141 |
| 2005/0105016 A1 * | 5/2005 | Kurihara et al. | 349/96 |
| 2005/0185120 A1 * | 8/2005 | Kitoh et al. | 349/114 |
| 2005/0225707 A1 * | 10/2005 | Seo et al. | 349/122 |
| 2005/0275784 A1 * | 12/2005 | Ashizawa et al. | 349/141 |
| 2006/0022921 A1 * | 2/2006 | Miyake et al. | 345/87 |
| 2006/0118697 A1 * | 6/2006 | Lee et al. | 250/205 |
| 2007/0075627 A1 * | 4/2007 | Kimura et al. | 313/503 |
| 2007/0076158 A1 * | 4/2007 | Jung et al. | 349/143 |
| 2007/0164956 A1 * | 7/2007 | Araki et al. | 345/90 |
| 2008/0030662 A1 * | 2/2008 | Igeta | 349/114 |

* cited by examiner

FOREIGN PATENT DOCUMENTS

JP 2006-330578 12/2006
JP 2007-018458 1/2007

*Primary Examiner* — Kaveh Kianni
(74) *Attorney, Agent, or Firm* — Rader, Fishman & Grauer PLLC

(57) ABSTRACT

Disclosed herein is a liquid crystal display apparatus, including: a liquid crystal panel having a display region for displaying an image and having a plurality of pixels disposed in the region; and a pair of first and second polarizing plates provided in an opposing relationship to each other through the display region; the liquid crystal panel including a first substrate, a second substrate opposed in a spaced relationship to the first substrate, and a liquid crystal layer sandwiched by and between the first and second substrates and oriented.

2 Claims, 16 Drawing Sheets

FIG. 5
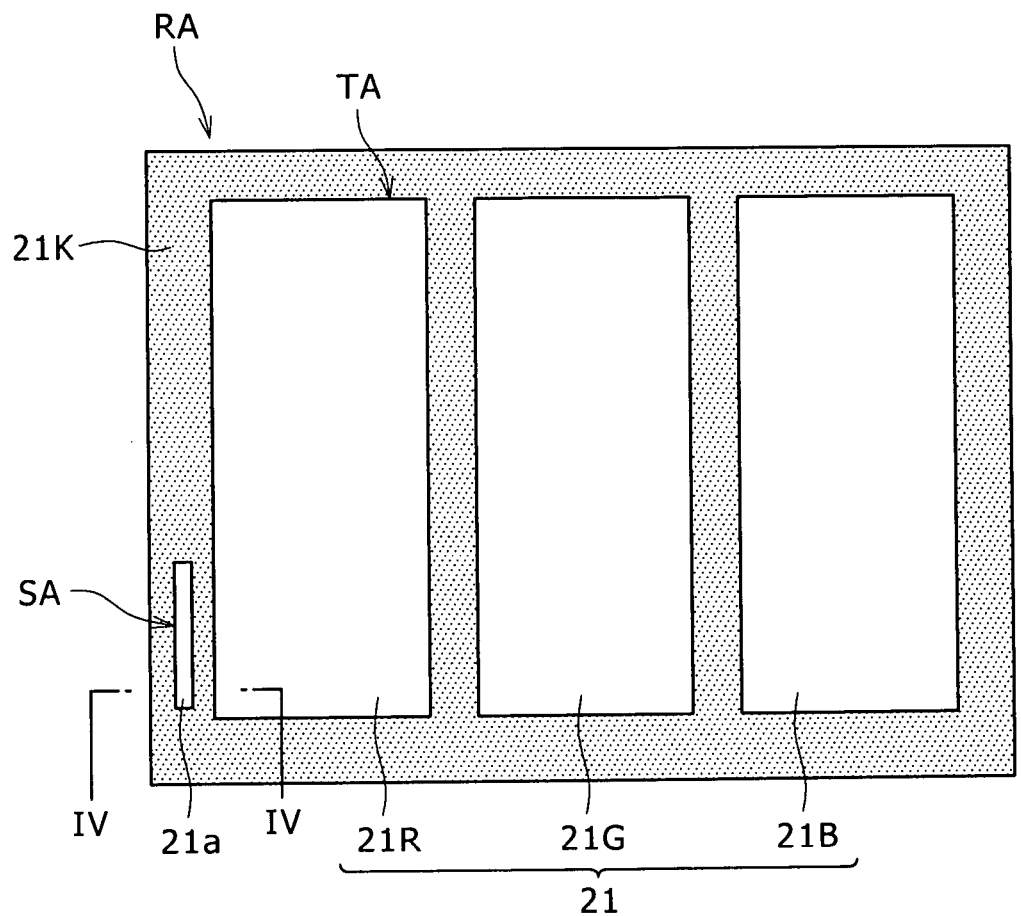
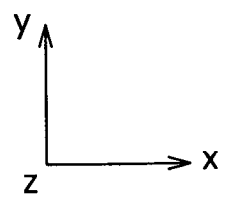

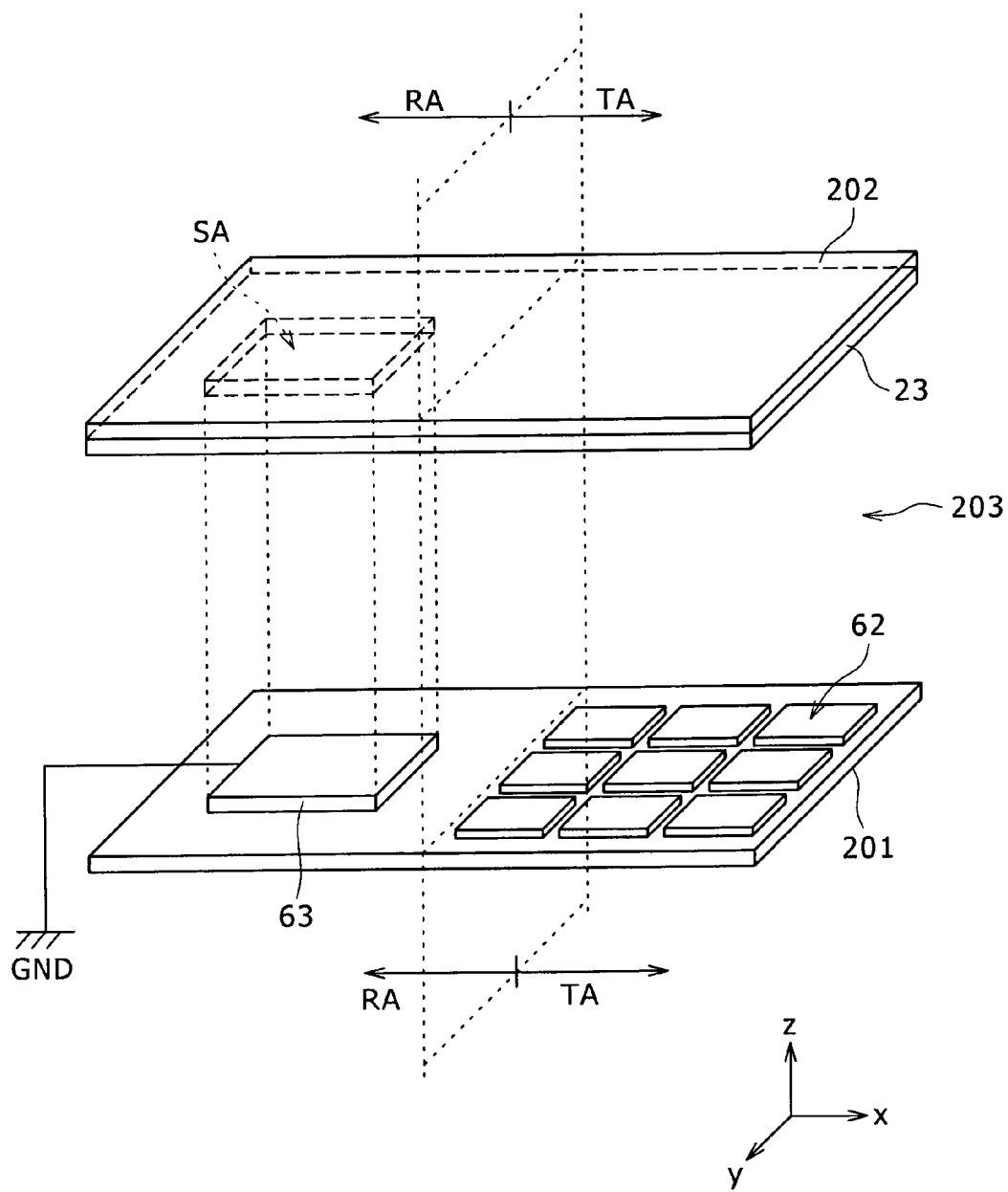

LIQUID CRYSTAL DISPLAY APPARATUS

CROSS REFERENCES TO RELATED APPLICATIONS

This is a Continuation Application of U.S. patent application Ser. No. 12/230,155, filed Aug. 25, 2008, which claims priority from Japanese Patent Application JP 2007-232769 filed in the Japan Patent Office on Sep. 7, 2007, the entire contents of which being incorporated herein by reference.

BACKGROUND OF THE INVENTION

1. Field of the Invention

This invention relates to liquid crystal display apparatuses, and particularly to a liquid crystal display apparatus which includes a liquid crystal panel wherein a plurality of light receiving elements for detecting light are formed in a display region in which a plurality of pixels for displaying an image are disposed such that the position of a face of the liquid crystal panel with which a detection object physical body touches is detected based on light detected by the light receiving elements.

2. Description of the Related Art

A liquid crystal display apparatus is advantageous in that it is slim, light in weight and low in power consumption. Therefore, the liquid crystal display apparatus is used very much in electronic apparatus for various applications including mobile applications such as a portable telephone set and a digital camera.

A liquid crystal display apparatus includes a liquid crystal panel including a pair of substrates and a liquid crystal layer filled between the substrates. Typically, the liquid crystal display apparatus modulates light irradiated from a planar light source such as a backlight provided on the rear face side of the liquid crystal panel and transmits the modulated light therethrough. An image is displayed on the front face side of the liquid crystal panel with the modulated light transmitted through the liquid crystal panel.

The liquid crystal panel is, for example, of the active matrix type, in which thin film transistors (TFTs) which function as pixel switching elements are formed in a display region for displaying an image. When a potential is inputted to a pixel electrode, the corresponding pixel switching element varies the voltage to be applied to the liquid crystal layer to control the transmission factor of light to be transmitted through the pixel thereby to modulate the light.

Liquid crystal display apparatus have been proposed wherein a light receiving element is built in addition to a TFT which functions as such a pixel switching element as described above. For example, it has been proposed to form, for example, TFTs which function as light receiving elements on a TFT array substrate on which a plurality of TFTs which function as pixel switching elements are formed in an array. The liquid crystal panel just described is disclosed, for example, in Japanese Patent Laid-Open No. 2007-18458.

Where light receiving elements are built in a liquid crystal display apparatus as described above, since a function as a user interface can be implemented, the necessity to provide a touch panel separately on the front face of the liquid crystal panel is eliminated. Therefore, miniaturization as a user interface is facilitated. Consequently, the liquid crystal panel is called I/O touch panel (Integrate-Optical touch panel).

In the liquid crystal panel, light of an image of a detection object physical body such as, for example, a finger of a user or a touch pen which touches with the front face of the liquid crystal panel is detected by the built-in light receiving elements. For example, an opening through which light advancing from the opposing substrate side positioned on the front face side in an opposing relationship to the TFT array substrate toward the TFT array substrate side positioned on the rear face side is provided in a corresponding relationship to the light receiving region, and the light receiving elements are formed in a corresponding relationship to the opening. Thus, the light transmitted through the light receiving region is received by the light receiving elements. Thereafter, the position at which the detection object physical body touches with the liquid crystal panel is specified based on the light detected by the light receiving elements. Then, an operation corresponding to the specified position is carried out by the liquid crystal display apparatus itself or by some other electronic apparatus connected to the liquid crystal display apparatus. A liquid crystal display apparatus of the type just described is disclosed, for example, in Japanese Patent Laid-Open No. 2006-330578.

SUMMARY OF THE INVENTION

However, in the liquid crystal panel described above, since the light receiving region is open so as to allow light to be transmitted therethrough, back light irradiated from the back side is sometimes transmitted in the light receiving region to the front face side and deteriorates the image picture quality.

The fault described above is sometimes actualized particularly where an opening through which light incoming from the front face side of the liquid crystal panel is transmitted is formed in a black matrix layer formed in the display region so as to correspond to the light receiving region in order to maintain the intensity of light to be received by the light receiving elements. In particular, while a peripheral region around the light receiving region is masked by the black matrix region to intercept light, in the light receiving region, back light irradiated from the backlight is transmitted without being intercepted. Therefore, "light leakage" sometimes occurs in the display region. Where such light leakage occurs, portions other than the pixels become bright, resulting in deterioration of the picture quality of an image displayed in the display region.

In order to eliminate the disadvantage, a light blocking layer may be formed in a corresponding relationship to the light receiving region so that light from the backlight may not be transmitted to the front face side of the liquid crystal panel. However, to form the light blocking layer on the TFT array substrate on which the light receiving elements are formed is sometimes difficult from a restriction to the layout. Further, where the light blocking layer is provided on the opposing substrate opposing to the TFT array substrate, it is necessary to take the error when the opposing electrode is mounted on the TFT array substrate on which the light receiving elements are formed into consideration. This gives rise to necessity to increase the area of the light blocking layer, which results in drop of the numerical aperture of the display region and sometimes deteriorates the image picture quality.

In this manner, in a liquid crystal display apparatus which includes built-in light receiving elements, the image picture quality is sometimes deteriorated from the light receiving region thereof.

Therefore, it is demanded to provide a liquid crystal display apparatus which prevents "light leakage" in a light receiving region thereof and can improve the image picture quality.

According to an embodiment of the present invention, there is provided a liquid crystal display apparatus including a liquid crystal panel having a display region for displaying an image and having a plurality of pixels disposed in the region, and a pair of first and second polarizing plates provided in an opposing relationship to each other through the display region, the liquid crystal panel including a first substrate, a second substrate opposed in a spaced relationship to the first substrate, and a liquid crystal layer sandwiched by and between the first and second substrates and oriented, the liquid crystal panel having a light receiving region in which a light receiving element is formed on one of faces of the first and second substrates which oppose to each other in such a manner as to receive light advancing from the second substrate side toward the first substrate side, the first and second polarizing plates and the liquid crystal layer being disposed such that light advancing from the first substrate side toward the second substrate side is blocked in the light receiving region.

Preferably, the liquid crystal panel further includes a black matrix layer formed so as to partition the pixels in the display region and block light, the black matrix layer being formed such that an opening through which light is transmitted corresponds to the light receiving region, the liquid crystal panel being formed such that light transmitted through the opening formed in the black matrix layer from within the light advancing from the second substrate side toward the first substrate side is received by the light receiving element, the liquid crystal layer being formed such that the light advancing from the first substrate side toward the second substrate side is blocked without being transmitted through the opening formed in the black matrix layer.

Further preferably, the light receiving element is provided on the first substrate so as to receive the light advancing from the second substrate side toward the first substrate side through the liquid crystal layer.

Further preferably, the liquid crystal display apparatus further includes an illuminating section disposed in an opposing relationship to the face of the liquid crystal panel adjacent the first substrate and configured to irradiate light so as to advance from the first substrate side toward the second substrate side, the liquid crystal panel being configured such that the pixels modulate the light irradiated from the illuminating section to display an image in the display region and the liquid crystal layer blocks the light irradiated from the illumination section in the light receiving region.

Further preferably, the liquid crystal panel is configured such that an image is displayed in a normally black mode in the display region and, when an image is displayed in the display region, no voltage is applied to the liquid crystal layer in the light receiving region.

Further preferably, the liquid crystal display apparatus further includes a conductive layer which formed in a corresponding relationship to the light receiving region and connected to the liquid crystal layer, the conductive layer being placed in a grounded state.

Or, the liquid crystal display apparatus may further include a first electrode formed in a corresponding relationship to the light receiving region on the face of the first substrate which opposes to the second substrate and connected to the liquid crystal layer, and a second electrode formed in an opposing relationship to the first electrode through the liquid crystal layer on the face of the second substrate which opposes to the first substrate and connected to the liquid crystal layer, and wherein, when an image is displayed in the display region, potentials equal to each other are inputted to the first and second electrodes so that no voltage is applied to the liquid crystal layer.

Further preferably, one of the first and second electrodes is placed in a grounded state while the other one of the first and second electrodes is placed in a floating state.

Preferably, the liquid crystal panel is configured such that an image is displayed in a normally white mode in the display region and, when an image is displayed in the display region, a voltage is applied to the liquid crystal layer in the light receiving region.

Further preferably, the liquid crystal display apparatus further includes a first electrode formed in a corresponding relationship to the light receiving region on the face of the first substrate which opposes to the second substrate and connected to the liquid crystal layer, and a second electrode formed in an opposing relationship to the first electrode through the liquid crystal layer on the face of the second substrate which opposes to the first substrate and connected to the liquid crystal layer, and wherein, when an image is displayed in the display region, potentials different from each other are inputted to the first and second electrodes.

In the liquid crystal display apparatus, light advancing from the first substrate side toward the second substrate side in the light receiving region is intercepted by the first polarizing plate, second polarizing plate and liquid crystal layer.

With the liquid crystal display apparatus, "light leakage" in the light receiving region can be prevented, and consequently, the image picture quality of the display image can be improved.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a view schematically showing a plane of the display region of the liquid crystal panel of FIG. 2;

FIG. 6 is a fragmentary perspective view showing a pixel electrode and a conductive layer formed on a TFT array substrate and an opposing electrode formed on an opposing substrate of the liquid crystal panel of FIG. 2;

DETAILED DESCRIPTION OF THE PREFERRED EMBODIMENTS

First Embodiment (General Configuration of the Liquid Crystal Display Apparatus)

Figure 1:
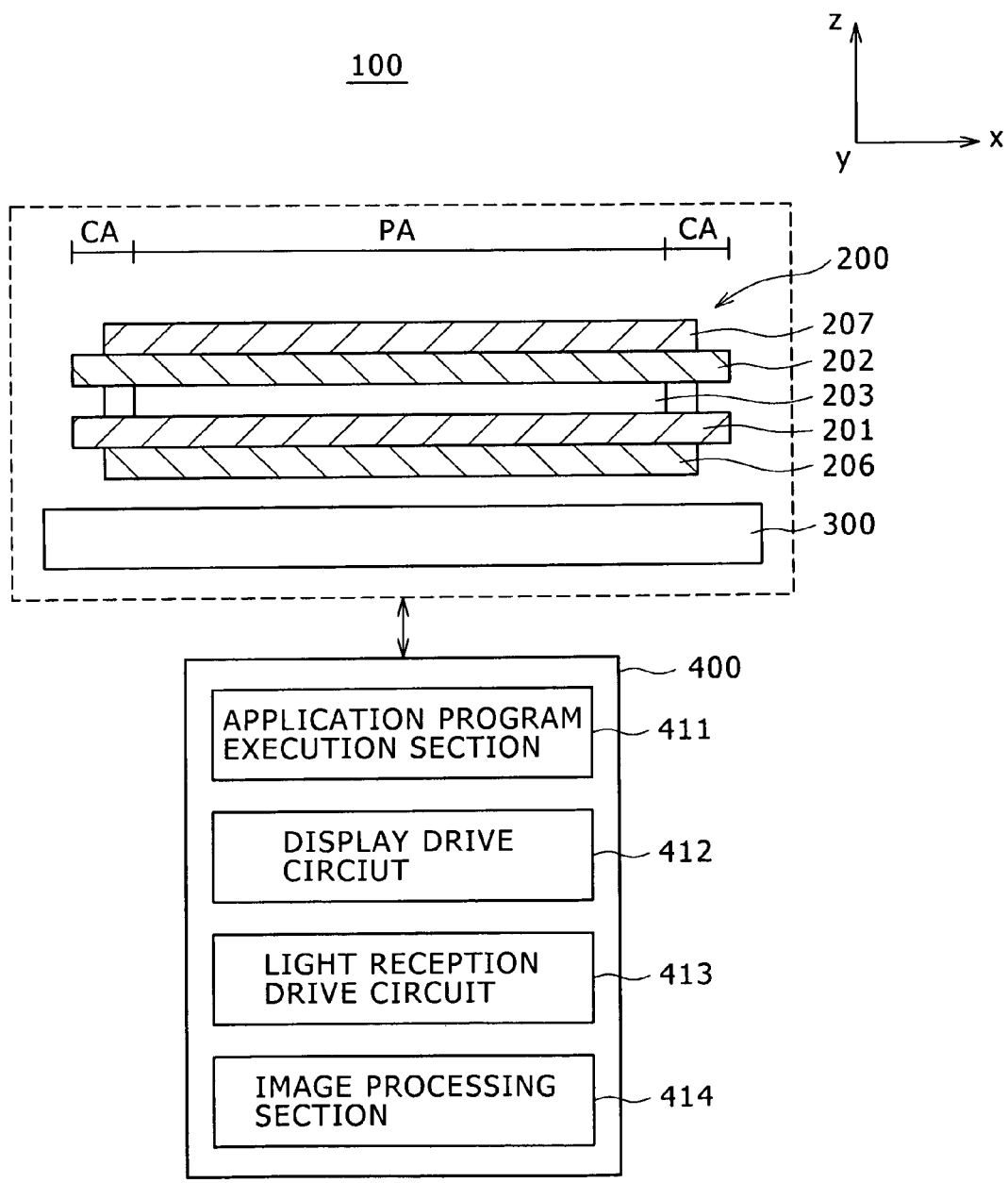
FIG. 1 is a cross sectional view showing a configuration of a liquid crystal display apparatus according to a first embodiment of the present invention.

FIG. 1 shows a configuration of a liquid crystal display apparatus 100 according to a first embodiment of the present invention.

Referring to FIG. 1, the liquid crystal display apparatus 100 shown includes a liquid crystal panel 200, a backlight 300 and a control section 400. The components are successively described below.

The liquid crystal panel 200 includes a TFT array substrate 201, an opposing substrate 202 and a liquid crystal layer 203.

In the liquid crystal panel 200, the TFT array substrate 201 and the opposing substrate 202 are opposed in a spaced relationship from each other. The liquid crystal layer 203 is provided in a sandwiched relationship between the TFT array substrate 201 and the opposing substrate 202.

Further, a first polarizing plate 206 and a second polarizing plate 207 are disposed in an opposing relationship to each other on the opposite face sides of the liquid crystal panel 200. Here, the first polarizing plate 206 is disposed adjacent the TFT array substrate 201 while the second polarizing plate 207 is disposed adjacent the opposing substrate 202.

The backlight 300 is disposed so as to be positioned adjacent the TFT array substrate 201 of the liquid crystal panel 200 such that light emitted from the backlight 300 is irradiated upon the face of the TFT array substrate 201 which does not oppose to the opposing substrate 202. The liquid crystal panel 200 has a display region PA for displaying an image, and receives light emitted from the backlight 300 disposed on the rear face side of the liquid crystal panel 200 from the rear face side through the first polarizing plate 206 and modulates the light received from the back face side in the display region PA. Then, the modulated light emerges to the front face side through the second polarizing plate 207 to display an image in the display region PA.

In the present embodiment, the liquid crystal panel 200 is such an I/O touch panel as mentioned hereinabove and includes light receiving elements not shown formed so as to receive light advancing from the opposing substrate 202 side toward the TFT array substrate 201 side as hereinafter described in detail. In particular, when a detection object physical body such as a finger of a user or a touch pen touches with the front face of the liquid crystal panel 200 remote from the back face adjacent which the backlight 300 is disposed, the light receiving elements receive an image of the detection object physical body and output a light reception signal.

The backlight 300 is disposed in an opposing relationship to the rear face of the liquid crystal panel 200 and irradiates light upon the display region PA of the liquid crystal panel 200. The backlight 300 includes a light source not shown which may be an LED or the like, and a light guide plate not shown for converting light from the light source into planar light. Thus, the backlight 300 irradiates white light as planar light upon the overall area of the display region PA of the liquid crystal panel 200.

In the present embodiment, the backlight 300 is disposed so as to be positioned adjacent the TFT array substrate 201 from between the TFT array substrate 201 and the opposing substrate 202 which form the liquid crystal panel 200. The backlight 300 thus irradiates the planar light on the face of the TFT array substrate 201 which doe not oppose to the opposing substrate 202. In other words, the backlight 300 irradiates light such that the light advances from the TFT array substrate 201 side toward the opposing substrate 202 side.

The control section 400 includes an application program execution section 411, a display drive circuit 412, a light reception drive circuit 413 and an image processing section 414.

The application program execution section 411 of the control section 400 includes a computer, which executes an application program and outputs control signals to the components of the liquid crystal display apparatus 100 to control the components. The display drive circuit 412 drives the liquid crystal panel 200 to carry out image displaying operation in accordance with a control signal outputted from the application program execution section 411. For example, the display drive circuit 412 drives the liquid crystal panel 200 to execute line-sequential driving. The light reception drive circuit 413 drives the light receiving elements provided on the liquid crystal panel 200 to read out light reception signals produced by the light receiving elements in accordance with a control signal outputted from the application program execution section 411. For example, the display drive circuit 412 drives the liquid crystal panel 200 to execute line-sequential driving. The image processing section 414 carries out an image process in accordance with a control signal outputted from the application program execution section 411. Here, the image processing section 414 analyzes the position at which a detection object physical body such as a finger of a user or a touch pen touches to produce analysis data based on light reception signals read out by the light reception drive circuit 413.

(General Configuration of the Liquid Crystal Panel)

Now, the liquid crystal panel 200 is described in detail.

Figure 2:
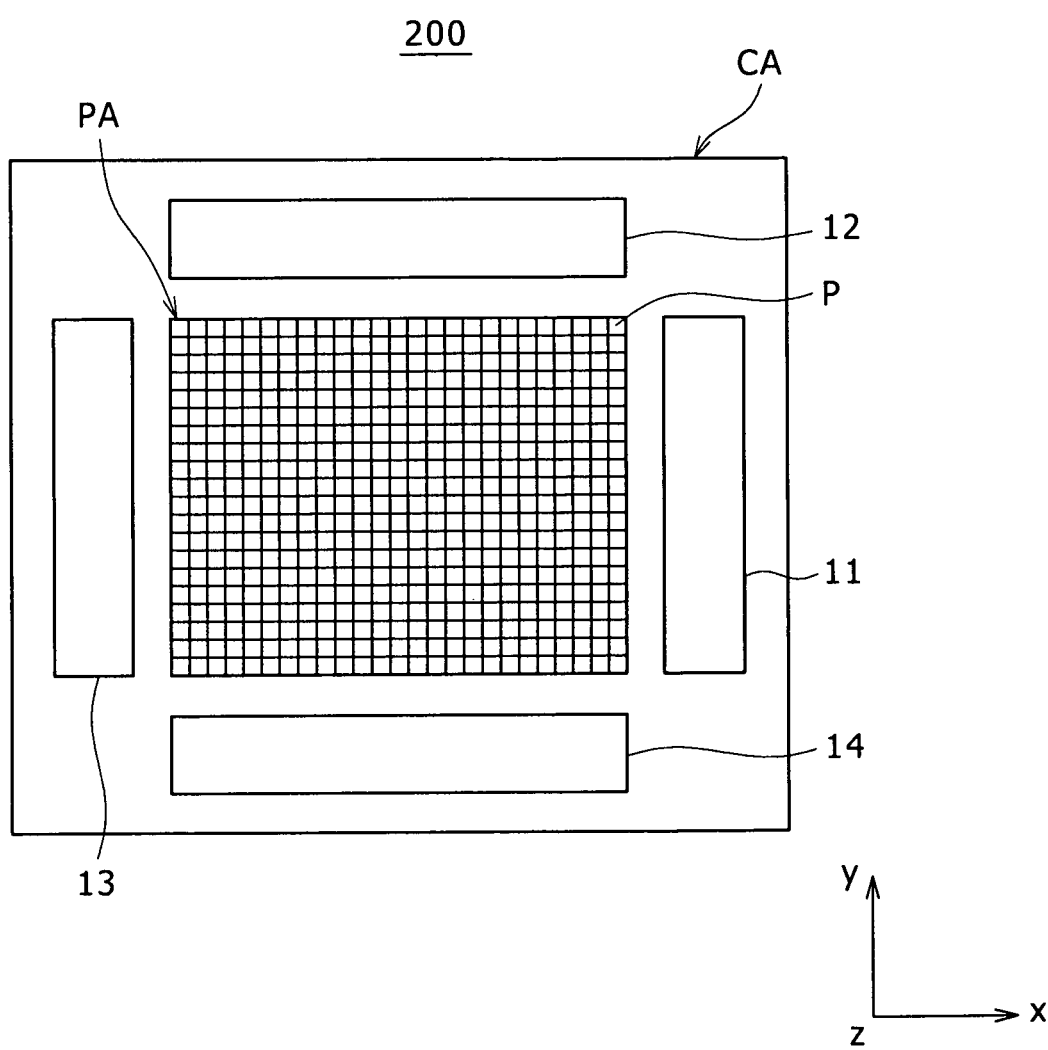
FIG. 2 is a plan view showing a liquid crystal panel of the liquid crystal display apparatus of FIG. 1.
Figure 3:
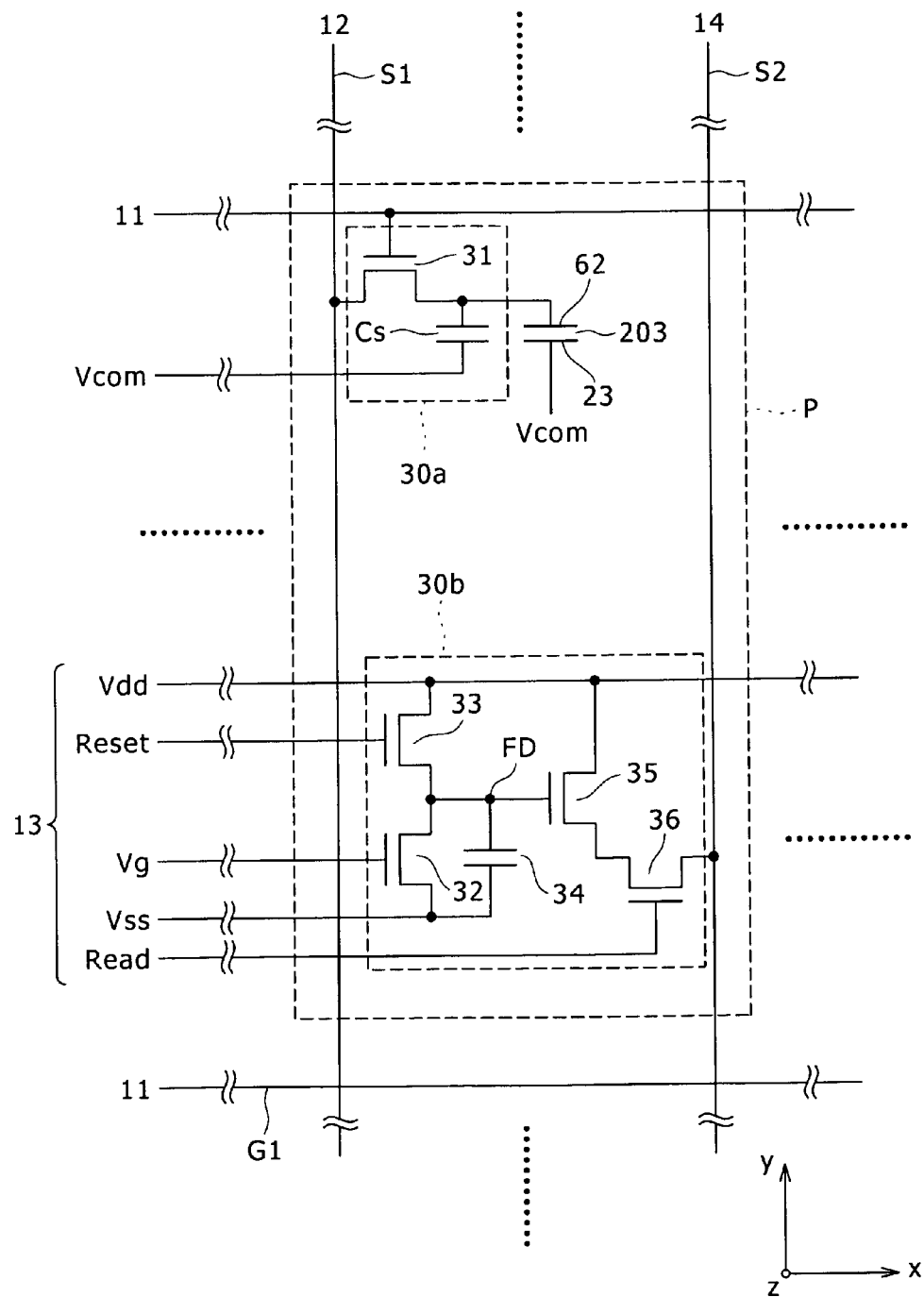
FIG. 3 is a circuit diagram showing part of a circuit formed in a display region of the liquid crystal panel of FIG. 2.

FIG. 2 shows a plan view of the liquid crystal panel 200, and FIG. 3 shows part of a circuit formed in the display region PA.

Referring to FIG. 2, the liquid crystal panel 200 includes a displaying vertical driving circuit 11, a displaying horizontal driving circuit 12, a sensor vertical driving circuit 13, and a sensor reading out horizontal driving circuit 14. All of the displaying vertical driving circuit 11, displaying horizontal driving circuit 12, sensor vertical driving circuit 13 and sensor reading out horizontal driving circuit 14 are formed in a peripheral region CA positioned around the display region PA.

In a region of the liquid crystal panel 200 corresponding to the display region PA, a plurality of pixels P are disposed in a matrix wherein the pixels P are juxtaposed in a horizontal direction x and a vertical direction y. Here, each of the pixels P is formed such that it includes a pixel circuit 30a and a sensor circuit 30b as seen in FIG. 3.

The components mentioned are successively described below.

Referring to FIG. 3, the displaying vertical driving circuit 11 is connected to a plurality of gate lines G1 formed so as to extend in the horizontal direction x and juxtaposed in the vertical direction y. The displaying vertical driving circuit 11 successively supplies a selection pulse to the gate lines G1 juxtaposed in the vertical direction y in accordance with a driving signal supplied thereto from the display drive circuit 412.

The displaying horizontal driving circuit 12 is connected to a plurality of first data lines S1 formed so as to extend in the vertical direction y and juxtaposed in the horizontal direction x. The displaying horizontal driving circuit 12 successively supplies an image signal to the first data lines S1 juxtaposed in the horizontal direction x in accordance with a driving signal supplied thereto from the display drive circuit 412.

The sensor vertical driving circuit 13 is connected to a plurality of readout lines Read formed so as to extend in the horizontal direction x and juxtaposed in the vertical direction y. The sensor vertical driving circuit 13 successively supplies a selection pulse to the readout lines Read juxtaposed in the vertical direction y.

The sensor reading out horizontal driving circuit 14 is connected to a plurality of second data lines S2 formed so as to extend in the vertical direction y and juxtaposed in the horizontal direction x. The sensor reading out horizontal driving circuit 14 successively reads out a light reception signal from the second data lines S2 juxtaposed in the horizontal direction x.

The pixel circuit 30a includes a pixel switching element 31 and an auxiliary capacitance element Cs and drives the pixel P.

The pixel switching element 31 and the auxiliary capacitance element Cs of the pixel circuit 30a are provided in the proximity of an intersecting point of a first data line S1 for display extending in the vertical direction y and a gate line G1 extending in the horizontal direction x as seen in FIG. 3. The pixel switching element 31 is connected at the gate electrode thereof to the gate line G1, at the source thereof to the first data line S1, and at the drain electrode thereof to the auxiliary capacitance element Cs and the liquid crystal layer 203. Meanwhile, the auxiliary capacitance element Cs is connected at one terminal thereof to an auxiliary capacitance line and at the other terminal thereof to the drain electrode of the pixel switching element 31. Further, the gate line G1 is connected to the displaying vertical driving circuit 11, and the first data line S1 is connected to the displaying horizontal driving circuit 12.

Therefore, after a selection pulse is supplied to the gate line G1 from the displaying vertical driving circuit 11 to place the pixel switching element 31 into an on state, if an image signal is supplied to the first data line S1 by the displaying horizontal driving circuit 12, then the pixel switching element 31 writes the image signal into the auxiliary capacitance element Cs and the liquid crystal layer 203.

The sensor circuit 30b includes a light receiving element 32, a reset transistor 33, a capacitor 34, an amplification transistor 35 and a selection transistor 36.

The light receiving element 32 is connected at the source thereof to a reference potential Vss and at the drain thereof to a floating diffusion FD. A voltage Vg lower than a threshold voltage of the light receiving element 32 is applied to the gate of the light receiving element 32.

The reset transistor 33 is connected at the drain thereof to a power supply voltage Vdd and at the source thereof to the floating diffusion FD. If a reset signal (Reset) is applied to the gate of the reset transistor 33, then the potential of the floating diffusion FD is reset.

The capacitor 34 is connected between the floating diffusion FD and the reference potential Vss. The potential at the floating diffusion FD varies in response to the charge amount accumulated in the capacitor 34.

The amplification transistor 35 is connected at the gate thereof to the floating diffusion FD, at the drain thereof to the power supply voltage Vdd, and at the source thereof to the drain of the selection transistor 36 thereby to form a source follower circuit.

The selection transistor 36 is connected at the drain thereof to the source of the amplification transistor 35 and at the source thereof to a second data line S2. If a readout (Read) signal is supplied to the gate of the selection transistor 36 from the sensor vertical driving circuit 13, then the selection transistor 36 is placed into an on state, and a signal amplified by the amplification transistor 35 is outputted to the second data line S2.

In the sensor circuit 30b, if a reset signal is supplied to the gate of the reset transistor 33, then the reset transistor 33 is placed into an on state, and charge is accumulated into the capacitor 34 and the voltage of the floating diffusion FD comes to have a value corresponding to the power supply voltage Vdd. Thereafter, the reset transistor 33 is placed into an off state. Then, if the light receiving element 32 receives light, then leak current or off current corresponding to the received light amount is generated. Consequently, the charge accumulated in the capacitor 34 is discharged, and the voltage of the floating diffusion FD drops. Then, the voltage of the floating diffusion FD is amplified by the amplification transistor 35, and a read signal is supplied from the sensor vertical driving circuit 13 to the gate of the selection transistor 36 and consequently is read out as a signal voltage to the second data line S2. Then, the signal voltage read out into the second data line S2 comes to have a value corresponding to the received light amount of the light receiving element 32. Thereafter, the signal voltage is sent to the sensor reading out horizontal driving circuit 14.

(Detailed Configuration of the Liquid Crystal Panel)

Figure 4:
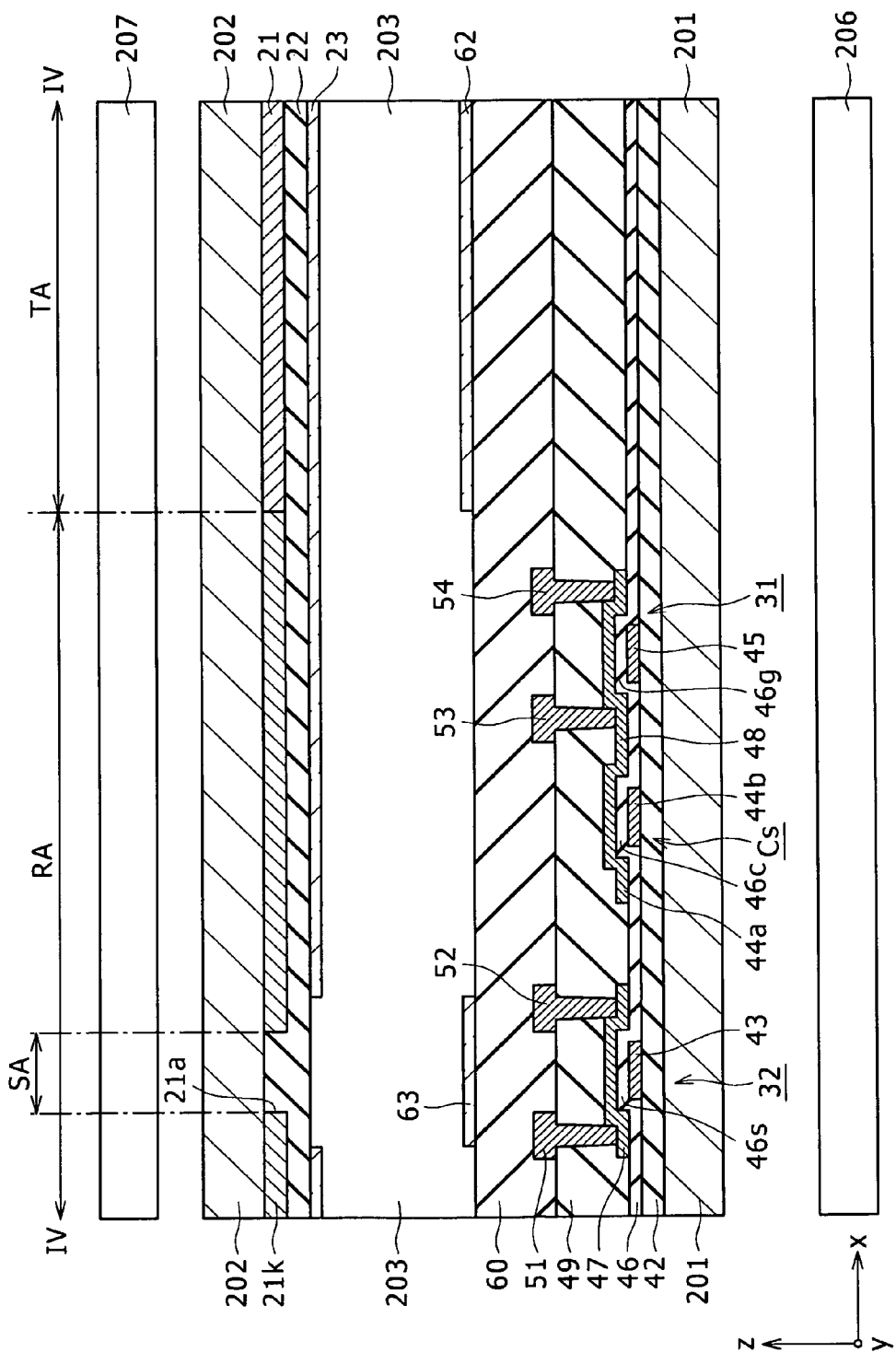
FIG. 4 is a cross sectional view schematically showing a cross section of the display panel of FIG. 2 taken at the display region.

FIG. 4 schematically shows a cross section of the display panel 200 of FIG. 2 taken at the display region PA, and FIG. 5 schematically shows a plane of the display region PA of the liquid crystal panel of FIG. 2. FIG. 4 particularly shows a cross section taken along line IV-IV of FIG. 5.

Referring first to FIG. 4, the liquid crystal panel 200 includes a TFT array substrate 201, an opposing substrate 202 and a liquid crystal layer 203. In the liquid crystal panel 200, the TFT array substrate 201 and the opposing substrate 202 are adhered to each other with a space left therebetween by a spacer not shown. The liquid crystal layer 203 is provided in the space between the TFT array substrate 201 and the opposing substrate 202.

Referring to FIGS. 4 and 5, the liquid crystal panel 200 includes a light transmission region TA and a light interception region RA.

In the light transmission region TA, light emitted from the backlight 300 is transmitted from the TFT array substrate 201 side to the opposing substrate 202 side. A color filter layer 21 is formed in the light transmission region TA as seen in FIGS. 4 and 5, and colors light irradiated from the backlight 300 and transmits the colored light from the TFT array substrate 201 side to the opposing substrate 202 side.

On the other hand, in the light interception region RA, a black matrix layer 21K is formed as seen in FIG. 4 and blocks light irradiated from the backlight 300 around the color filter layer 21.

The liquid crystal panel 200 includes a light receiving region SA as seen in FIGS. 4 and 5.

In the light receiving region SA, the light receiving elements 32 are formed on a face of the TFT array substrate 201 opposing to the opposing substrate 202 in such a manner as to receive light advancing from the opposing substrate 202 side toward the TFT array substrate 201 side. Each of the light receiving elements 32 receives light of an image of a detection object physical body such as a finger of a user from the opposing substrate 202 side as seen in FIG. 4.

Although details are hereinafter described, the liquid crystal layer 203 is formed in such a manner as to intercept, in the light receiving region SA, light advancing from the TFT array substrate 201 side toward the opposing substrate 202 side.

Here, as seen in FIG. 4, the light receiving element 32 is formed in such a manner as to receive, from within light advancing from the opposing substrate 202 side toward the TFT array substrate 201, light which is transmitted through an opening 21a formed in the black matrix layer 21K. Further, the liquid crystal layer 203 is formed in such a manner as to intercept light advancing from the TFT array substrate 201 side toward the opposing substrate 202 without being passed through the opening 21a formed in black matrix layer 21K. More particularly, the liquid crystal layer 203 of the liquid crystal panel 200 is formed such that light emitted from the backlight 300 is modulated to display an image in the display region PA while the light emitted from the backlight 300 is intercepted in the light receiving region SA.

In the present embodiment, the liquid crystal panel 200 displays an image in the display region PA in accordance with a normally black mode, and although details are hereinafter described, the liquid crystal panel 200 is configured such that, when an image is to be displayed in the display region PA, no voltage is applied to the liquid crystal layer in the light receiving region SA.

The components of the liquid crystal panel 200 are described below.

First, the TFT array substrate 201 is described.

The TFT array substrate 201 is a substrate of an insulating material which transmits light therethrough and is formed, for example, from glass. In the TFT array substrate 201, a pixel switching element 31, a auxiliary capacitance element Cs, a light receiving element 32 and a pixel electrode 62 are formed on the face of the TFT array substrate 201 opposing to the opposing substrate 202 as seen in FIG. 4.

It is to be noted that, although the aforementioned reset transistor 33, capacitor 34, amplification transistor 35 and selection transistor 36 are formed in an integrated manner in the light interception region RA, illustration of the elements is omitted for simplified illustration. Further, while a dot region corresponding to a red filter layer 21R of the color filter layer 21 of the display region PA is shown in FIG. 4, in dot regions corresponding to the other filter layers, that is, a green filter layer 21G and a blue filter layer 21B, the other members than the optical sensor circuit such as the light receiving element 32 are formed similarly to those in the case of the dot region corresponding to the red filter layer 21R.

The components of the TFT array substrate 201 are described.

Referring to FIG. 4, the pixel switching element 31 is formed on the face of the TFT array substrate 201 opposing to the opposing substrate 202 with an insulating layer 42 interposed therebetween. The pixel switching element 31 includes a gate electrode 45, a gate insulating film 46g and a semiconductor layer 48 and is formed, for example, as a bottom gate type TFT.

In particular, the gate electrode 45 is formed using a metal material such as, for example, molybdenum. Meanwhile, the gate insulating film 46g is formed using an insulating material such as a silicon dioxide film. The semiconductor layer 48 is formed using a semiconductor material such as, for example, polycrystalline silicon. In the semiconductor layer 48, a channel formation region is formed in a corresponding relationship to the gate electrode 45, and a pair of source/drain regions are formed in such a manner as to sandwich the channel region. A drain electrode 53 and a source electrode 54 are formed in an opening formed in an insulating layer 49 which covers the semiconductor layer 48 by burying a conductive material such as aluminum in the opening and patterning the conductive material.

The auxiliary capacitance element Cs is formed on a face of the TFT array substrate 201 opposing to the opposing substrate 202 with the insulating layer 42 interposed therebetween. In the present embodiment, the auxiliary capacitance element Cs is formed such that a dielectric film 46c is sandwiched by and between an upper electrode 44a and a lower electrode 44b. Here, the upper electrode 44a is formed by a same process as that for formation of the gate electrode 45 of the pixel switching element 31, the dielectric film 46C is formed by a same process as that for formation of the gate insulating film 46g of the pixel switching element 31, and the lower electrode 44b is formed by a process similar to that for formation of the semiconductor layer 48. The auxiliary capacitance element Cs is formed so as to be connected in parallel to electrostatic capacitance by the liquid crystal layer 203 and stores charge provided by a data signal applied to the liquid crystal layer 203.

The light receiving element 32 is formed on the face of the TFT array substrate 201 opposing to the opposing substrate 202 with the insulating layer 42 interposed therebetween. Here, the light receiving element 32 is provided on the TFT array substrate 201 such that it receives light, which advances from the opposing substrate 202 side toward the TFT array substrate 201 side, through the liquid crystal layer 203 as seen in FIG. 4. This light receiving element 32 is a phototransistor, and includes a gate electrode 43, a gate insulating film 46s and a semiconductor layer 47 and is formed, for example, as a bottom gate type TFT. The light receiving element 32 receives and photoelectrically converts light incoming from the light receiving region SA to produce a light reception signal.

In particular, in the light receiving element 32, the gate electrode 43 is formed using a metal material such as, for example, molybdenum. The gate insulating film 46s is formed using an insulating material such as a silicon oxide film. The semiconductor layer 47 is formed using a semiconductor material such as, for example, polycrystalline silicon. In the semiconductor layer 47, a channel formation region is formed in a corresponding relationship to the gate electrode 43, and a pair of source/drain regions are formed in such a manner as to sandwich the channel region. A source electrode 51 and a drain electrode 52 are formed by burying aluminum in the opening formed in the insulating layer 49. Here, the components mentioned are formed by a process same as that for formation of the pixel switching element 31.

The pixel electrode 62 is formed in such a manner as to cover an interlayer insulating film 60 which is formed so as to cover the face of the TFT array substrate 201 opposing to the opposing substrate 202. Here, the pixel electrode 62 is formed in a corresponding relationship to the light transmission region TA on the interlayer insulating film 60 and connected to the liquid crystal layer 203. Further, the pixel electrode 62 is a transparent electrode formed, for example, using ITO. The pixel electrode 62 cooperates with an opposing electrode 23 to apply a voltage to the liquid crystal layer 203 in order to modulate light irradiated by the backlight 300. It is to be noted that a plurality of such pixel electrodes 62 are disposed in a matrix in the display region PA such that they individually correspond to the pixels P.

A conductive layer 63 is formed on the interlayer insulating film 60 formed so as to cover the face of the TFT array substrate 201 opposing to the opposing substrate 202 as seen in FIG. 4. Here, the conductive layer 63 is formed so as to correspond to the light receiving region SA and connected to the liquid crystal layer 203. Here, the conductive layer 63 is formed so as to cover a portion of the interlayer insulating film 60 which corresponds to the light receiving region SA, and is connected to the liquid crystal layer 203. The conductive layer 63 is formed using, for example, ITO similarly to the pixel electrode 62 and is patterned in a spaced relationship from the pixel electrode 62.

The opposing substrate 202 is described.

The opposing substrate 202 is a substrate of an insulating material which transmits light therethrough similarly to the TFT array substrate 201 and is formed from glass. The opposing substrate 202 is opposed in a spaced relationship from the TFT array substrate 201 as seen in FIG. 1. As shown in FIG. 4, the color filter layer 21, the black matrix layer 21K, a flattening layer 22 and the opposing electrode 23 are formed on the opposing substrate 202.

The components of the opposing substrate 202 are described.

The color filter layer 21 is formed on the face of the opposing substrate 202 opposing to the TFT array substrate 201. Referring to FIG. 5, the color filter layer 21 includes a red filter layer 21R, a green filter layer 21G and a blue filter layer 21B in a corresponding relationship to the light transmission region TA. Here, the red filter layer 21R, green filter layer 21G and blue filter layer 21B have a rectangular shape and are formed so as to be juxtaposed in the horizontal direction x. The color filter layer 21 is formed using a polyimide resin which contains a coloring agent such as pigment or dyestuff. Here, filters for the three primary colors of red, green and blue are formed as a set. The color filter layer 21 colors light emitted from the backlight 300.

The black matrix layer 21K is formed in the light interception region RA in such a manner as to partition a plurality of pixels P in the display region PA as seen in FIG. 4 and blocks light. Here, the black matrix layer 21K is formed on the face of the opposing substrate 202 which opposes to the TFT array substrate 201. Further, the opening 21a of the color filter layer 21 through which light is transmitted is formed in a corresponding relationship to the light receiving region SA. In other words, the black matrix layer 21K is formed such that it corresponds to the region of the light interception region RA other than the light receiving region SA as seen in FIGS. 4 and 5. The black matrix layer 21K is formed using black metal-oxide film, for example.

The flattening layer 22 is formed on the face of the opposing substrate 202 opposing to the TFT array substrate 201 in a corresponding relationship to the light transmission region TA and the light interception region RA. Here, the flattening layer 22 is formed from an insulating material having a light transmitting property. The flattening layer 22 covers the color filter layer 21 and the black matrix layer 21K to flatten the face of the opposing substrate 202 opposing to the TFT array substrate 201.

The opposing electrode 23 is formed on the face of the opposing substrate 202 opposing to the TFT array substrate 201. Here, the opposing electrode 23 is formed so as to cover the flattening layer 22. The opposing electrode 23 is a transparent electrode and is formed, for example, from ITO.

FIG. 6 shows the pixel electrode 62 and the conductive layer 63 formed on the TFT array substrate 201 and the opposing electrode 23 formed on the opposing substrate 202 of the liquid crystal panel 200.

Referring to FIG. 6, the opposing electrode 23 is provided such that, in the light transmission region TA through which light is transmitted in the display region PA, it corresponds to the plurality of pixel electrodes 62 formed in a corresponding relationship to the pixels P and functions as a common electrode common to the pixels P.

On the other hand, in the light interception region RA in which light is intercepted in the display region PA, the opposing electrode 23 is formed such that, outside the light receiving region SA, it extends continuously from the light transmission region TA and covers the light interception region RA, but in the light receiving region SA, the opposing electrode 23 is not formed.

In particular, as seen in FIG. 6, in the light transmission region TA and in the light interception region RA except the light receiving region SA, a plurality of conductive layers are provided in an opposing relationship to each other with the liquid crystal layer 203 interposed therebetween like the pixel electrodes 62 and the opposing electrode 23. In contrast, in the light receiving region SA, the conductive layer 63 is formed only on one side, but no conductive layer is formed at a position in the light receiving region SA opposing to the conductive layer 63 through the liquid crystal layer 203. Further, the conductive layer 63 is formed so as to be in a grounded state (GND) as seen in FIG. 6.

The liquid crystal layer 203 is described.

Referring back to FIG. 4, the liquid crystal layer 203 is sandwiched between the TFT array substrate 201 and the opposing substrate 202 and is in an orientated state. For example, the liquid crystal layer 203 is enclosed in the gap formed between the TFT array substrate 201 and the opposing substrate 202 and having a predetermined distance kept by a spacer not shown. The liquid crystal layer 203 is oriented by liquid crystal orientation films not shown formed on the TFT array substrate 201 and the opposing substrate 202. In the present embodiment, the liquid crystal layer 203 is orientated such that the liquid crystal panel 200 displays an image in the display region PA in accordance with a normally black mode. For example, the liquid crystal layer 203 is formed such that liquid crystal molecules are orientated vertically, and the first polarizing plate 206 and the second polarizing plate 207 are disposed such that, in a state wherein no voltage is applied to the liquid crystal layer 203, light from the backlight 300 is intercepted and black is displayed in the display region PA.

In particular, the components are formed in such optical design as described in the following. For example, a circularly polarizing plate is used for the first polarizing plate 206 disposed on the lower side and the second polarizing plate 207 disposed on the upper side. Here, for example, a linearly polarizing plate to which a phase difference film of 140 nm for light of $\lambda=550$ nm is adhered is used. At this time, the phase difference film and the linearly polarizing plate are adhered such that the angle defined by the slow axis of the film and the absorption axis of the linearly polarizing plate becomes 45°. Further, in order to implement normally black display, liquid crystal for vertical orientation is used as the liquid crystal material. Consequently, in a state wherein no voltage is applied to the liquid crystal material, black display can be implemented.

By this, the light receiving elements can receive light advancing from the opposing substrate 202 side toward the TFT array substrate 201 side in the light receiving region SA on the faces of the TFT array substrate 201 and the opposing substrate 202 which oppose to each other. Further, light advancing from the TFT array substrate 201 side toward the opposing substrate 202 is intercepted in the light receiving region SA.

(Operation)

In the following, operation of the liquid crystal display apparatus 100 when it detects the position at which a detection object physical body such as a finger of a user touches with the display region PA of the liquid crystal panel 200 or to which the detection object physical body is moved is described.

If a detection object physical body such as a finger of a user touches with or is moved in the display region PA, then light of an image of the detection object physical body is received by the light receiving elements 32 formed corresponding to the light receiving region SA on the liquid crystal panel 200.

Here, the light of the image of the detection object physical body F is changed into circularly polarized light by the second polarizing plate 207 and transmitted as it is through the liquid crystal layer 203 while the polarization state is maintained, whereafter it is received by the light receiving element 32.

Then, the light receiving element 32 produces a light reception signal of a signal intensity corresponding to the intensity of the received light. Thereafter, the light reception signal is read out by the sensor vertical driving circuit 13 and the sensor reading out horizontal driving circuit 14, and the position at which the detection object physical body F touches with the display region PA is calculated based on the position of the light receiving element 32 and the intensity of the light reception signal read out from the light receiving element 32.

In the following, operation of the liquid crystal display apparatus 100 when the liquid crystal panel 200 is driven is described.

FIGS. 7A, 7B, 8A and 8B illustrate manners of the liquid crystal panel 200 when it is driven.

Figure 7A:
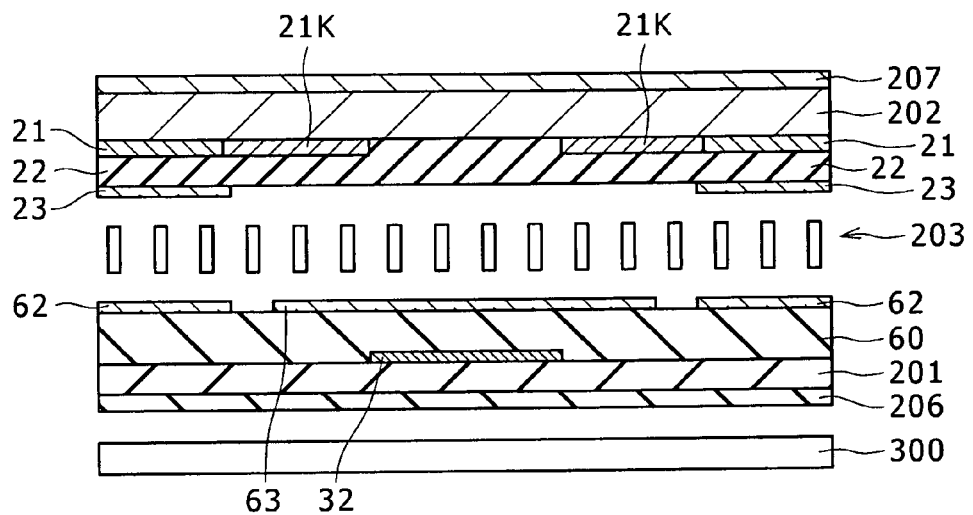
FIGS. 7A and 7B are cross sectional views schematically illustrating a manner wherein the liquid crystal panel of FIG. 2 is driven.
Figure 7B:
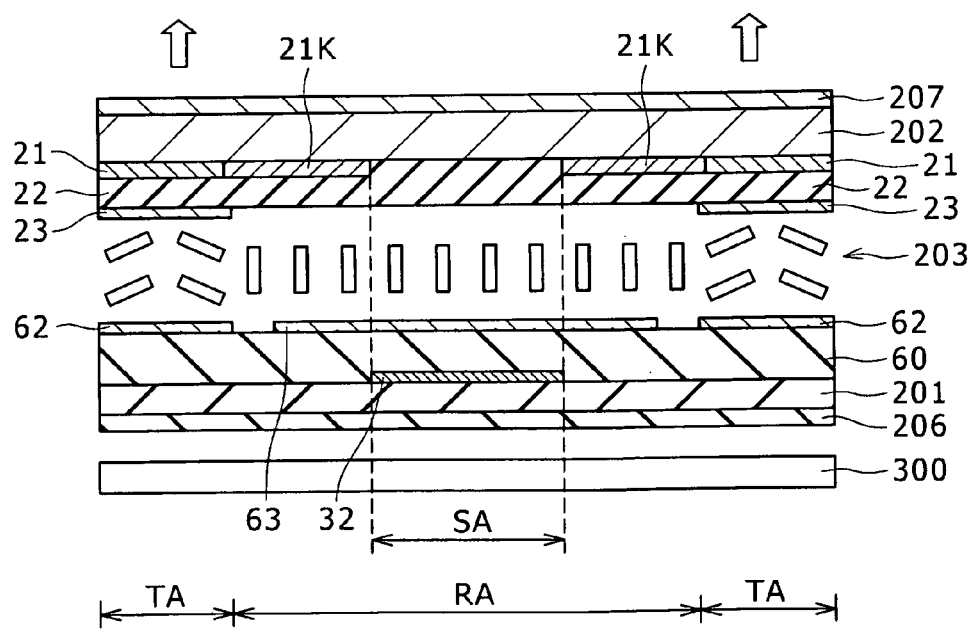
Figure 8A:
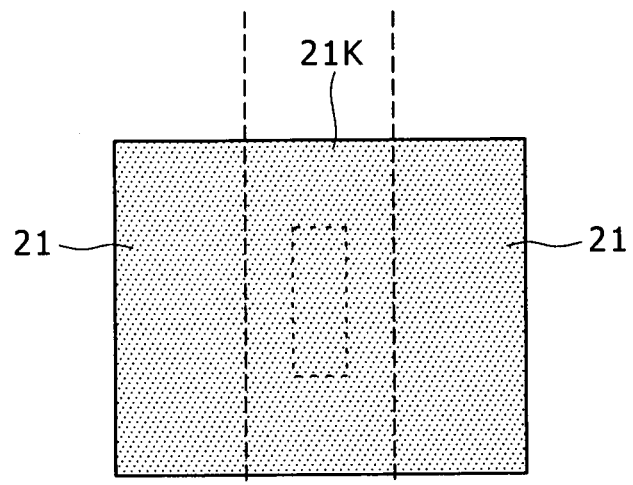
FIGS. 8A and 8B are plan views schematically illustrating a manner wherein the liquid crystal panel of FIG. 2 is driven.
Figure 8B:
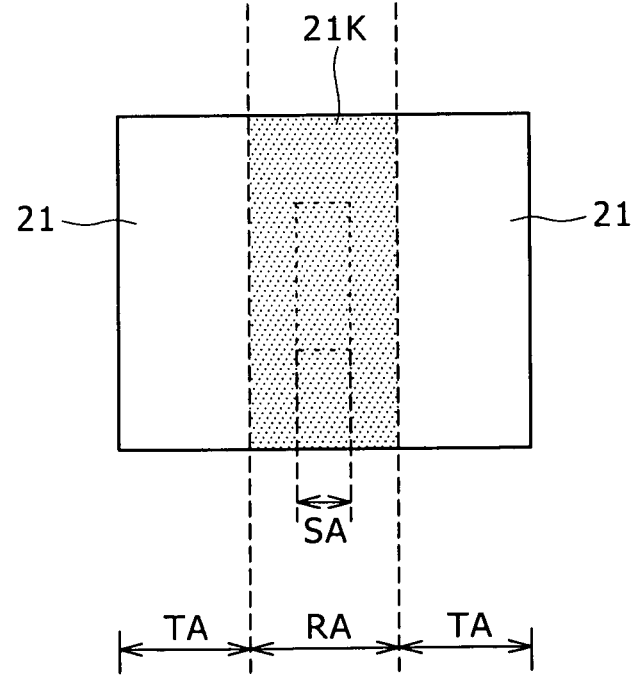

Here, FIGS. 7A and 7B are sectional views schematically illustrating a manner of the liquid crystal panel 200 when it is driven. Meanwhile, FIGS. 8A and 8B are plan views illustrating a manner of the liquid crystal panel 200 when it is driven. Further, FIGS. 7A to 8B schematically show the light receiving region SA and a surrounding corresponding portion of the liquid crystal panel 200 in an enlarged scale, and FIGS. 7A and 8A illustrate a state wherein no voltage is applied to the liquid crystal layer 203 of the liquid crystal panel 200 while FIGS. 7B and 8B illustrate another state wherein a voltage is applied to the liquid crystal layer 203 of the liquid crystal panel 200.

In the state wherein no voltage is applied to the liquid crystal layer 203 of the liquid crystal panel 200, since the liquid crystal display apparatus 100 of the present embodiment uses the normally black mode as described hereinabove, the orientation state of the liquid crystal layer 203 is maintained similarly in both of the light transmission region TA and the light interception region RA as seen in FIG. 7A.

Therefore, in the light transmission region TA in which the pixel electrode 62 and the opposing electrode 23 oppose to each other, light from the backlight 300 is intercepted to carry out black display as seen in FIG. 8A. Meanwhile, in the light interception region RA, light from the backlight 300 is intercepted by the black matrix layer 21K as seen in FIG. 8A, and also in the light receiving region SA in which the opening 21a is formed in the black matrix layer 21K, light from the backlight 300 is intercepted without being transmitted.

In particular, light emitted from the backlight 300 is converted into circularly polarized light by the first polarizing plate 206 and is transmitted through the liquid crystal layer 203 while the polarization state is not changed. Thereafter, the polarization state of the light is changed from circular polarization into linear polarization by the second polarizing plate 207. At this time, since the oscillation axis of the light coincides with the absorption axis of the second polarizing plate 207, the light is not transmitted to the front face side.

Therefore, the light irradiated from the rear face side in the light receiving region SA is not transmitted to the front face side.

In other words, as seen in FIG. 8A, light from the backlight 300 is intercepted without being transmitted in both of the light transmission region TA and the light interception region RA. Therefore, since the light is intercepted over the overall area of the light interception region RA, occurrence of "light leakage" in the light receiving region SA is prevented.

On the other hand, in the state wherein a voltage is applied to the liquid crystal layer 203 of the liquid crystal panel 200, since the display mode is the normally black mode, in the light transmission region TA, a voltage is applied to the liquid crystal layer 203 in response to a potential difference between the pixel electrode 62 and the opposing electrode 23 as seen in FIG. 7B. Therefore, the orientation state of the liquid crystal layer 203 varies. On the other hand, while, in the light interception region RA, the conductive layer 63 is formed on the TFT array substrate 201 side in a corresponding relationship to the light receiving region SA, since no conducting layer is formed at a portion of the opposing substrate 202 opposing to the conductive layer 63, no voltage is applied to the liquid crystal layer 203, and consequently, the orientation of the liquid crystal layer 203 is maintained.

Therefore, in the light transmission region TA in which the pixel electrode 62 and the opposing electrode 23 oppose to each other, light emitted from the backlight 300 is transmitted to carry out color display as seen in FIG. 8B. In contrast, in the light interception region RA, since the situation is similar to that described hereinabove with reference to FIG. 8A, light emitted from the backlight 300 is intercepted by the black matrix layer 21K as seen in FIG. 8B. Further, also in the light receiving region SA in which the opening 21a is formed in the black matrix layer 21K, light from the backlight 300 is intercepted without being transmitted. Therefore, since light is intercepted over the overall area of the light interception region RA, occurrence of "light leakage" in the light receiving region SA is prevented.

Further, in the present embodiment, since the conductive layer 63 is formed on the TFT array substrate 201 side in a corresponding relationship to the light receiving region SA and is placed into a grounded state, electric field noise to the light receiving element 32 can be intercepted.

As described above, in the present embodiment, the liquid crystal layer 203, first polarizing plate 206 and second polarizing plate 207 are optically designed so that light emitted from the backlight 300 so as to advance from the TFT array substrate 201 side toward the opposing substrate 202 is intercepted in the light receiving region SA but is not transmitted from the opposing substrate 202 side. Here, light emitted from the backlight 300 is intercepted without being transmitted through the opening 21a formed in a corresponding relationship to the light receiving region SA in the black matrix layer 21K. In particular, in the present embodiment, an image is displayed in the display region PA in accordance with the normally black mode. Further, when an image is displayed in the display region PA, a voltage is not applied to the liquid crystal layer 203 in the light receiving region SA. Accordingly, in the present embodiment, occurrence of "light leakage" in the light receiving region SA is prevented as described hereinabove.

Further, as described hereinabove, since the conductive layer 63 is formed on the TFT array substrate 201 side in a corresponding relationship to the light receiving region SA and is placed into a grounded state, electric field noise to the light receiving element 32 can be intercepted.

Accordingly, with the liquid crystal display apparatus 100 of the present embodiment, the image picture quality of a display image can be improved.

Second Embodiment

Figure 9:
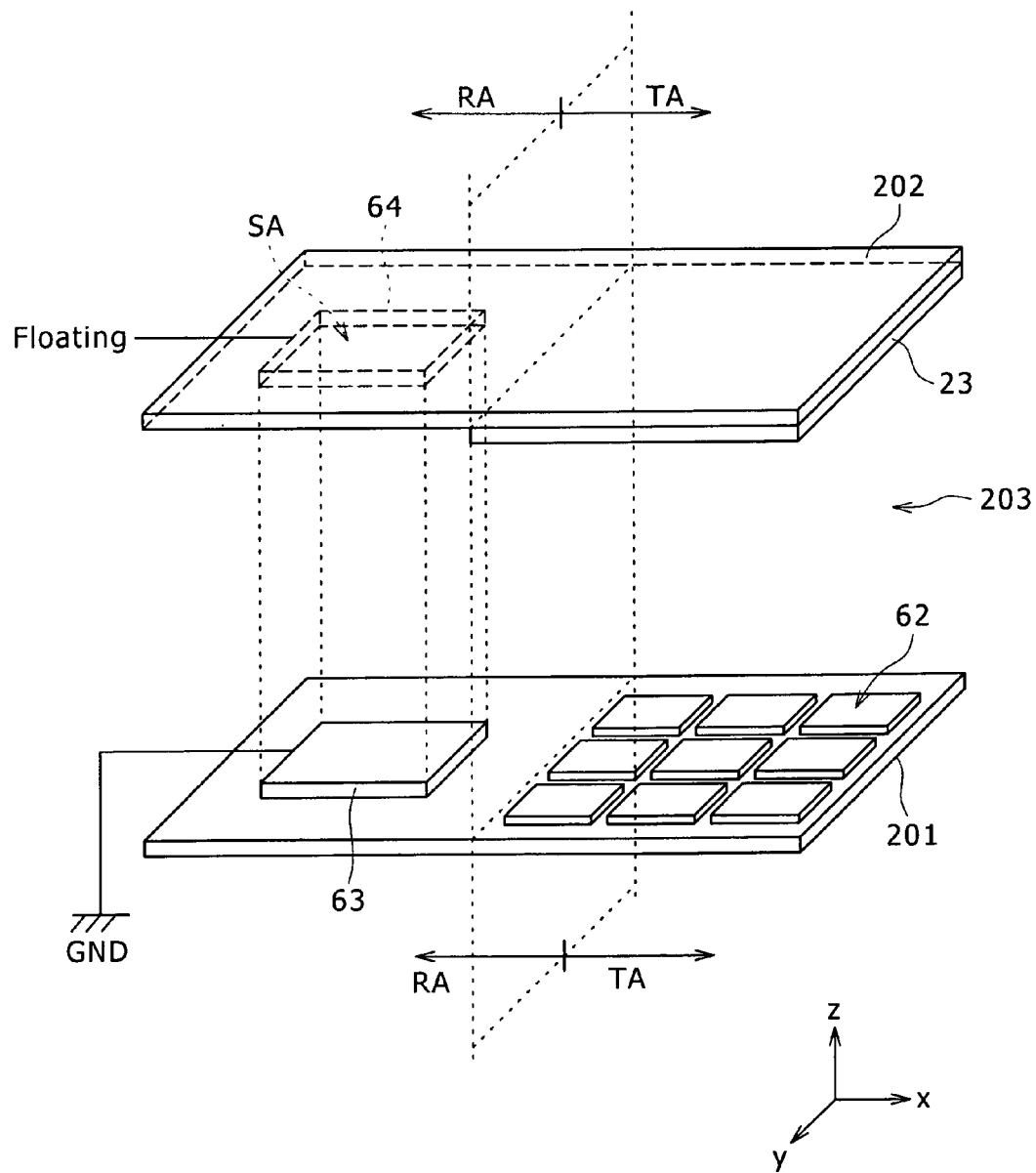
FIG. 9 is a fragmentary perspective view showing a liquid crystal panel of a liquid crystal display apparatus according to a second embodiment of the present invention.

FIG. 9 shows a liquid crystal panel 210 of a liquid crystal display apparatus according to a second embodiment of the present invention.

Referring to FIG. 9, as can be recognized from comparison with the liquid crystal panel 200 shown in FIG. 6, the liquid crystal panel 210 in the present embodiment is different in shape of the opposing electrode 23 formed on the opposing substrate 202 and is further different in that a conductive layer 64 formed separately on the opposing substrate 202. The liquid crystal display apparatus of the present embodiment is similar to that of the first embodiment except the differences just described, and overlapping description of the common configuration is omitted herein to avoid redundancy.

In the present embodiment, the opposing electrode 23 is provided such that, in the light transmission region TA of the display region PA, it corresponds to the plurality of pixel electrodes 62 formed so as to correspond to the pixels P.

On the other hand, in the light interception region RA in which light is intercepted in the display region PA, the conductive layer 64 is formed at a portion of the opposing substrate 202 corresponding to the light receiving region SA in an opposing relationship to the conductive layer 63 formed in a corresponding relationship to the light receiving region SA on the TFT array substrate 201.

In particular, in the light receiving region SA, a pair of conductive layers 63 and 64 are formed in such a manner as to sandwich the liquid crystal layer 203 therebetween.

Further, the conductive layer 63 formed on the TFT array substrate 201 is configured so as to be set to a grounded (GND) state similarly as in the first embodiment. On the other hand, the conductive layer 64 formed on the opposing substrate 202 is configured so as to be set to a floating state. In other words, the conductive layers 63 and 64 prevent a voltage from being applied to the liquid crystal layer 203.

Therefore, in the present embodiment, light from the backlight 300 is intercepted without being transmitted in the light receiving region SA in which the opening 21a is formed in the black matrix layer 21K.

Accordingly, with the liquid crystal display apparatus of the present embodiment, the image picture quality of the display image can be improved because occurrence of "light leakage" in the light receiving region SA is prevented similarly to the liquid crystal display apparatus of the first embodiment.

Third Embodiment

Figure 10:
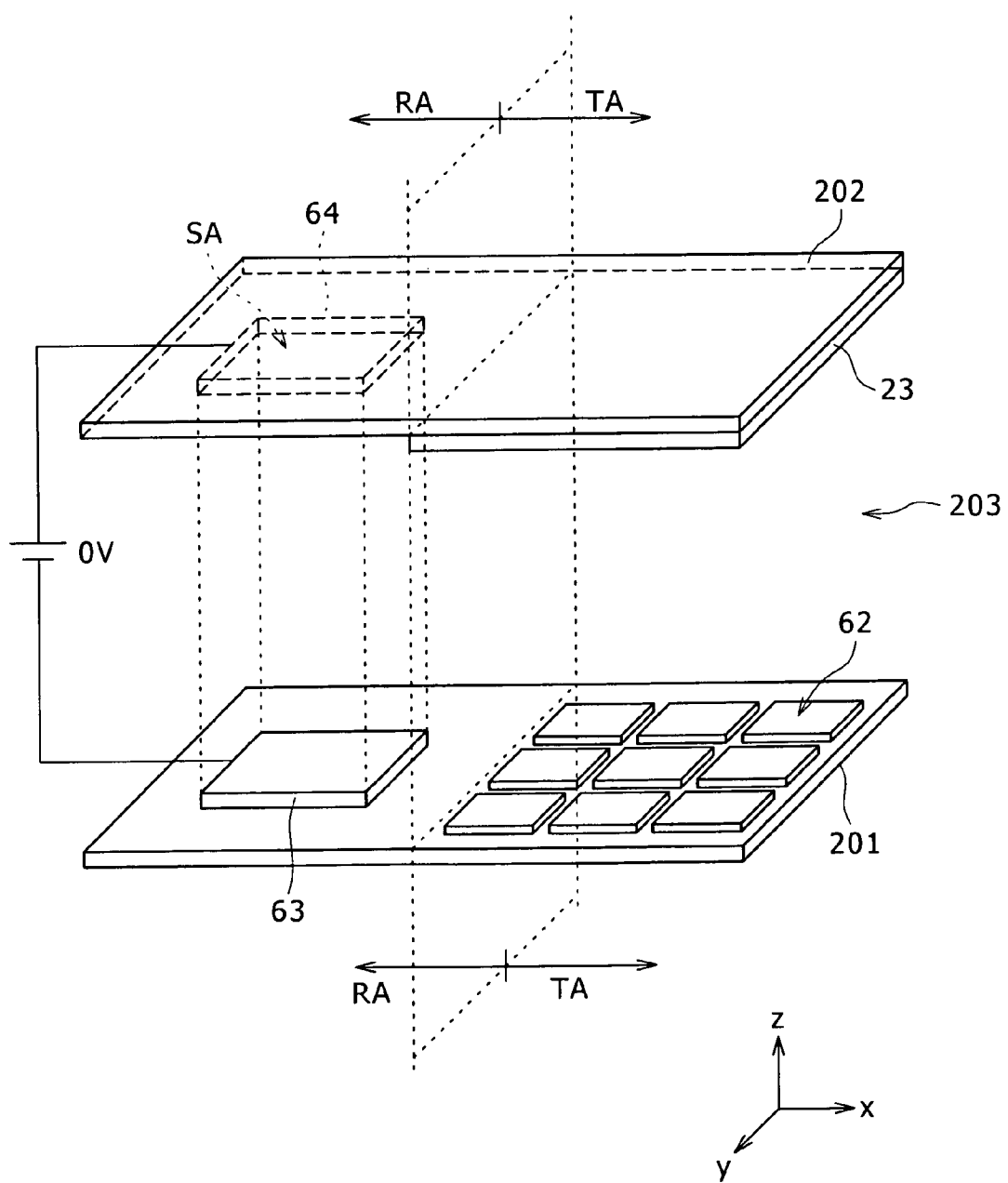
FIG. 10 is a fragmentary perspective view showing a liquid crystal panel of a liquid crystal display apparatus according to a third embodiment of the present invention.

FIG. 10 shows a liquid crystal panel 220 of a liquid crystal display apparatus according to a third embodiment of the present invention.

Referring to FIG. 10, as can be recognized from comparison with the liquid crystal panel 210 shown in FIG. 9, the opposing electrode 23 and the conductive layer 64 are formed on the opposing substrate 202 similarly as in the liquid crystal display apparatus of the second embodiment. However, the liquid crystal panel 220 in the present embodiment is different from that in the second embodiment in that the conductive layer 63 formed on the TFT array substrate 201 is not set to a grounded (GND) state. Further, the liquid crystal panel 220 in the present embodiment is different from that in the second embodiment in that the conductive layer 64 formed on the opposing substrate 202 is not set to a floating state. The liquid crystal display apparatus of the present embodiment is similar to that of the second embodiment except the differences just described, and overlapping description of the common configuration is omitted herein to avoid redundancy.

Referring to FIG. 10, in the liquid crystal panel 220 in the present embodiment, the conductive layer 63 formed on the TFT array substrate 201 is not set to a grounded (GND) state but set to a state wherein it has a predetermined potential. On the other hand, the conductive layer 64 formed on the opposing substrate 202 is not set to a floating state but set to a state wherein it has a potential equal to that of the conductive layer 63 formed on the TFT array substrate 201. In other words, the liquid crystal panel 220 is configured so as to apply no voltage to the liquid crystal layer 203.

Therefore, in the present embodiment, light from the backlight 300 is intercepted without being transmitted in the light receiving region SA in which the opening 21a is formed in the black matrix layer 21K.

Accordingly, with the liquid crystal display apparatus of the present embodiment, the image picture quality of the display image can be improved because occurrence of "light leakage" in the light receiving region SA is prevented similarly to the liquid crystal display apparatus of the second embodiment.

Fourth Embodiment

Figure 11:
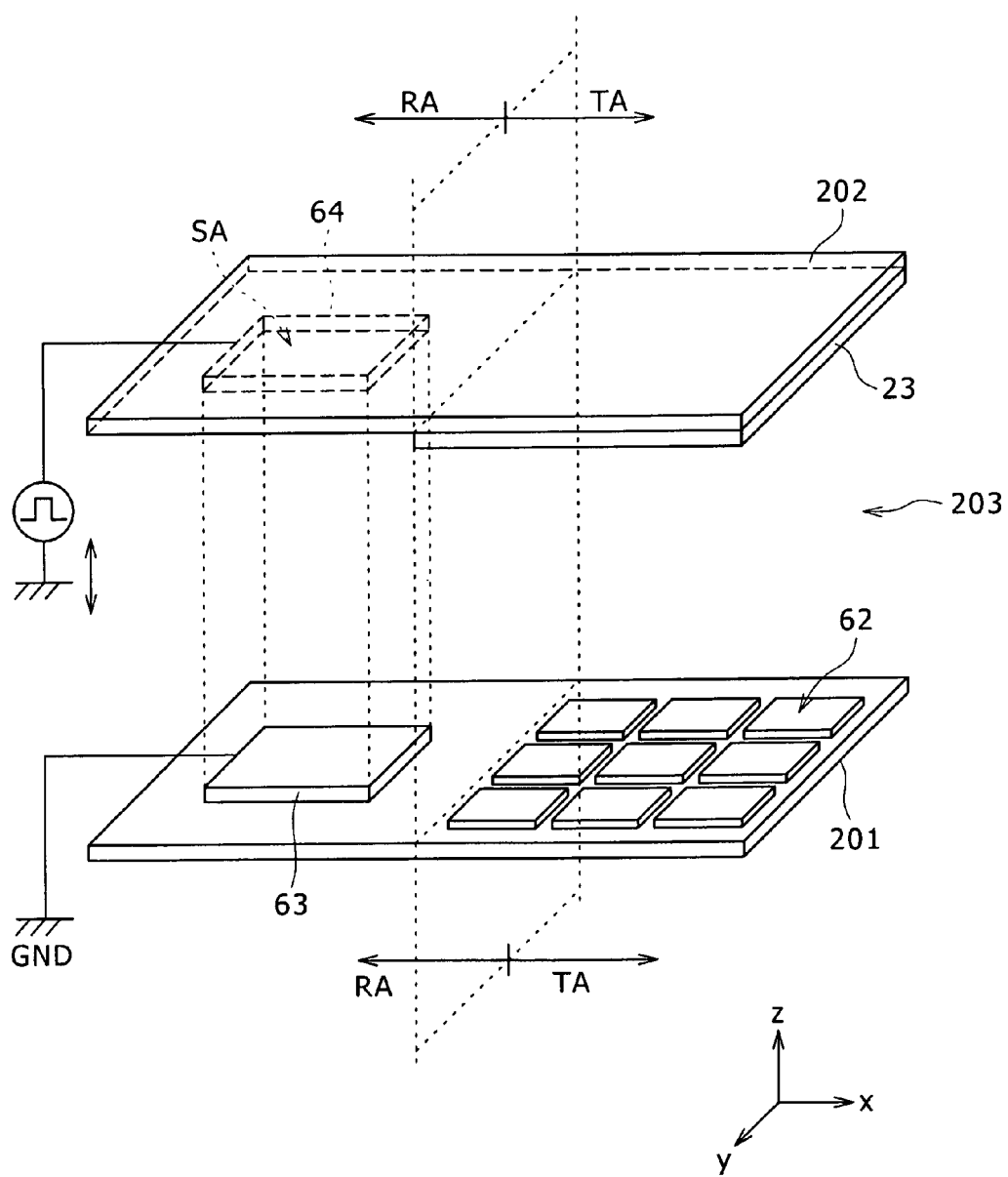
FIG. 11 is a fragmentary perspective view showing a liquid crystal panel of a liquid crystal display apparatus according to a fourth embodiment of the present invention.
Figure 12:
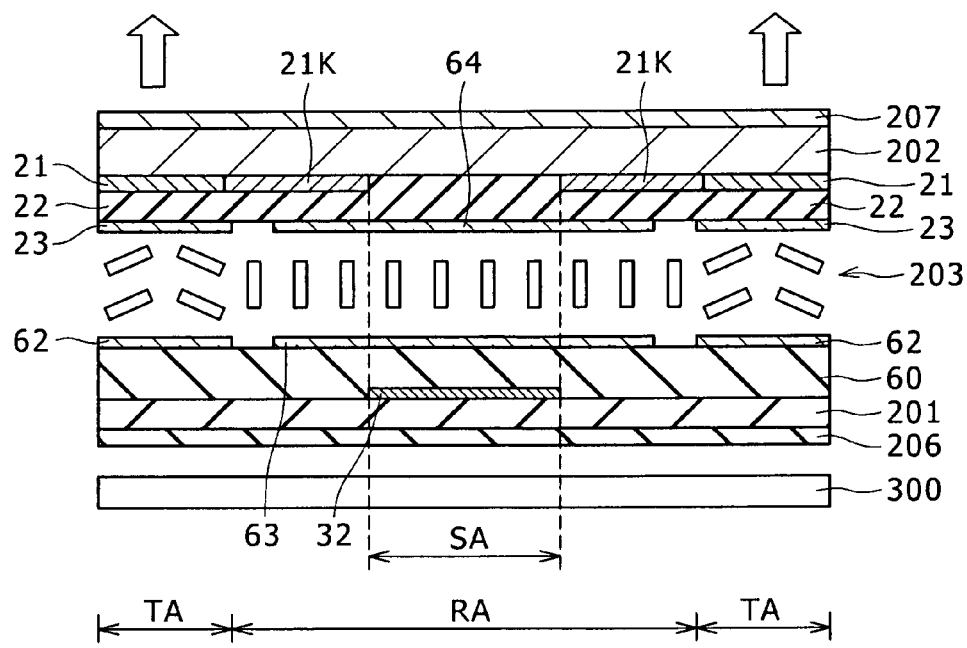
FIG. 12 is a cross sectional view showing the liquid crystal panel of FIG. 11.

FIG. 11 shows a liquid crystal panel 230 of a liquid crystal display apparatus according to a fourth embodiment of the present invention. Meanwhile, FIG. 12 shows a cross section of the liquid crystal panel 230 of FIG. 11 and particularly shows, in an enlarged scale, the light receiving region SA and part of a surrounding portion where image display is carried out on the liquid crystal panel 230.

Referring first to FIG. 11, as can be recognized from comparison with the liquid crystal panel 220 shown in FIG. 10, the liquid crystal panel 230 in the present embodiment is similar to that in the third embodiment in that the opposing electrode 23 and the conductive layer 64 are formed on the opposing substrate 202. However, the liquid crystal panel 230 in the present embodiment is different from that in the third embodiment in that, while the liquid crystal panel 220 in the third embodiment uses a normally black mode, the liquid crystal panel 230 in the present embodiment uses a normally white mode. Therefore, in order to carry out black display in the light receiving region SA, the liquid crystal panel 230 is configured such that a potential difference is provided between the conductive layer 63 formed on the TFT array substrate 201 and the conductive layer 64 formed on the opposing substrate 202. Further, since the normally white mode is used, the orientation direction of the liquid crystal layer 203 is different from that in the other embodiments described hereinabove as seen from FIG. 12. The liquid crystal display apparatus of the present embodiment is similar to that of the third embodiment except the differences just described, and overlapping description of the common configuration is omitted herein to avoid redundancy. It is to be noted that FIG. 12 illustrates a manner when the liquid crystal panel 230 is driven such that a potential difference is provided between the conductive layer 63 formed on the TFT array substrate 201 and the conductive layer 64 formed on the opposing substrate 202 as seen in FIG. 11.

In the present embodiment, the liquid crystal layer 203 is oriented in such a manner as seen in FIG. 11 such that the liquid crystal panel 230 displays an image in the light receiving region SA in accordance with the normally white mode as described hereinabove.

For example, the liquid crystal layer 203 is formed in such a manner that liquid crystal molecules thereof are oriented horizontally, and the first polarizing plate 206 and the second polarizing plate 207 are disposed such that, in a state wherein no voltage is applied to the liquid crystal layer 203, light from the backlight 300 is transmitted so that the white is displayed in the display region PA.

In particular, the components are formed in such optical design as described in the following. For example, a circularly or elliptically polarizing plate is used for the first polarizing plate 206 disposed on the lower side and the second polarizing plate 207 disposed on the upper side. As an example, a circularly or elliptically polarizing plate formed by adhering a phase difference film of 140 nm with respect to light whose wavelength λ is 550 nm to a linearly polarizing plate is used for the second polarizing plate 207. Meanwhile, for the first polarizing plate 206, a circularly or elliptically polarizing plate formed by adhering a phase difference film of 120 nm with respect to light whose wavelength λ is 550 nm to a linearly polarizing plate is used. Further, for the liquid crystal material, a material for horizontal orientation is used such that normally white display can be implemented when no voltage is applied to the liquid crystal layer. With the configuration described, black display can be achieved by applying a predetermined voltage to the liquid crystal.

In the present embodiment, when the liquid crystal panel 230 is driven, a potential difference is provided between the conductive layer 63 formed on the TFT array substrate 201 and the conductive layer 64 formed on the opposing substrate 202 as seen in FIG. 11 independently of pixel driving so as to apply a voltage to the liquid crystal layer 203.

Here, for example, an AC voltage is applied between the conductive layer 63 formed on the TFT array substrate 201 and the conductive layer 64 formed on the opposing substrate 202 as seen in FIG. 11. For example, a voltage of 5 V is applied to the liquid crystal layer 203 to carry out black display in the light receiving region SA.

Consequently, in the light interception region RA, light from the backlight 300 is intercepted by the black matrix layer 21K, and also in the light receiving region SA in which the opening 21a is formed in the black matrix layer 21K, light from the backlight 300 is intercepted without being transmitted.

In particular, light emitted from the backlight 300 is converted into circularly polarized light, actually into elliptically polarized light, by the first polarizing plate 206. Then, the light is converted into circularly polarized light of reverse rotation by the liquid crystal layer 203 to which a voltage is applied. Thereafter, the light is converted into linearly polarized light having a polarization direction coincident with that of the absorption axis of the polarizing second polarizing plate 207 by the second polarizing plate 207. Therefore, the light irradiated from the rear face side of the liquid crystal panel 230 is not transmitted to the front face side in the light receiving region SA.

Therefore, in the present embodiment, since light is intercepted over the overall area of the light interception region RA, occurrence of "light leakage" is prevented in the light receiving region SA similarly as in the embodiments described hereinabove. Accordingly, with the liquid crystal display apparatus of the present embodiment, the image picture quality of the display image can be improved.

It is to be noted that, in carrying out the present invention, the present invention is not limited to the embodiments described above, but various modifications may be adopted.

For example, while, in the embodiments described above, the pixel switching element 31 and the light receiving element 32 are formed as thin film transistors of the bottom gate type, the pixel switching element 31 and the light receiving element 32 are not limited to them. For example, the pixel switching element 31 and the light receiving element 32 may be formed as thin film transistors of the top gate type.

Further, while, in the embodiments described above, the pixel switching element 31 and the light receiving element 32 are formed as thin film transistors, the pixel switching element 31 and the light receiving element 32 are not limited to them.

Further, while, in the embodiments described above, the light receiving elements 32 are provided so as to be individually paired with the pixels P, the arrangement of the light receiving elements 32 is not limited to this. For example, one light receiving element 32 may be provided for a plurality of pixels P, or conversely, a plurality of light receiving elements 32 may be provided for one pixel P.

Further, while, in the embodiments described above, the light receiving region SA is provided in the display region PA, the provision of the light receiving region SA is not limited to this.

Figure 13:
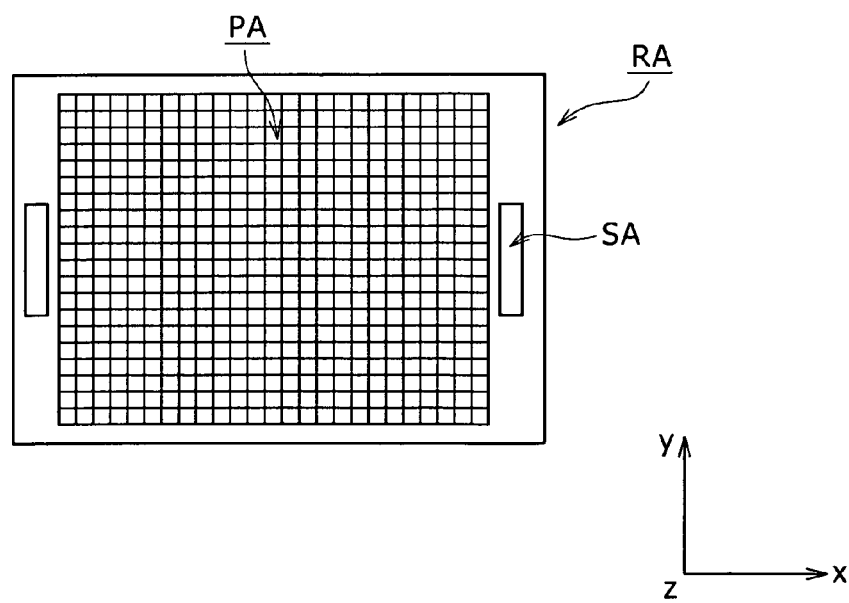
FIG. 13 is a plan view showing a modification to the liquid crystal display apparatus of the embodiments.

FIG. 13 shows a modification to the embodiments described above.

Referring to FIG. 13, the configuration of the embodiments described hereinabove may be applied to a light receiving region SA opened in a light interception region RA provided so as to surround a display region PA.

Further, while, in the first embodiment described hereinabove, the conductive layer 63 is provided only adjacent the TFT array substrate 201 in the light receiving region SA, the formation of the conductive layer 63 is not limited to this. For example, also where a conductive layer is provided only adjacent the opposing substrate 202 in the light receiving region SA, since no voltage is applied to the liquid crystal layer 203, an effect similar to that obtained by the first embodiment can be anticipated.

Further, while, in the second embodiment described hereinabove, the conductive layer 63 formed in the TFT array substrate 201 is set to a grounded (GND) state and the conductive layer 64 formed on the opposing substrate 202 is set to a floating state, setting of the states to the conductive layers 63 and 64 is not limited to this. For example, even if the conductive layer 63 formed on the TFT array substrate 201 is set to a floating state and the conductive layer 64 formed on the opposing substrate 202 is set to a grounded state, since no voltage is applied to the liquid crystal layer 203, an effect similar to that achieved by the second embodiment can be anticipated.

Further, the liquid crystal display apparatus 100 of the embodiments above can be applied as a part of various electronic apparatus.

Furthermore, while, in the first to fourth embodiments described above, the opposing electrode 23 is provided on the opposing substrate 202, the present invention is not limited to this. For example, the present invention may be applied to a liquid crystal display apparatus of the IPS (In-Plane Switching) mode or the FFS (Fringe Field Switching) mode wherein an opposing electrode which functions as a common electrode and a pixel electrode are provided on a TFT array substrate side with a pixel insulating film interposed therebetween and an arbitrary gap in the form of a slit is perforated in the pixel electrode such that a transverse electric field is produced between the opposing electrode and the pixel electrode to drive liquid crystal through the gap.

Particularly in a liquid crystal display apparatus of the FFS mode, an opposing electrode is provided over an overall area below a pixel electrode with an insulating layer interposed therebetween, and a semiconductor layer for forming a TFT for driving a pixel is provided below the opposing electrode. In the same layer as the semiconductor layer, another semiconductor layer which forms a sensor is formed corresponding to a light receiving region, and the opposing electrode is extended to the light receiving region in such a manner as to cover over the sensor. By the configuration, an influence of a transverse electric field upon the orientation of the liquid crystal in the light receiving region can be prevented.

FIGS. 14 to 18 show electronic apparatus to which the liquid crystal display apparatus 100 of the embodiments described above is applied.

Figure 14:
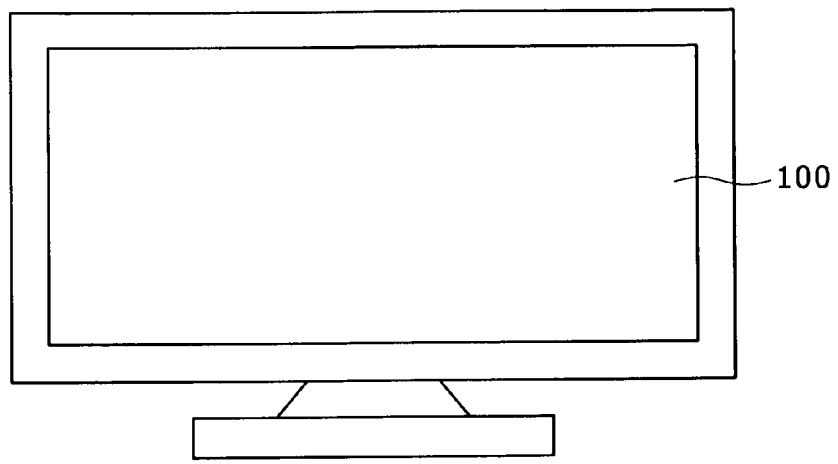
FIGS. 14, 15, 16, 17 and 18 are schematic views showing electronic apparatus to which the liquid crystal display apparatus according to the embodiments of the present invention can be applied.

Referring first to FIG. 14, the liquid crystal display apparatus 100 can be applied to a television apparatus which receives and displays a television broadcast. In the television apparatus, the liquid crystal display apparatus 100 is applied as a display apparatus which displays a received image on a display screen thereof and accepts an operation instruction of an operator.

Figure 15:
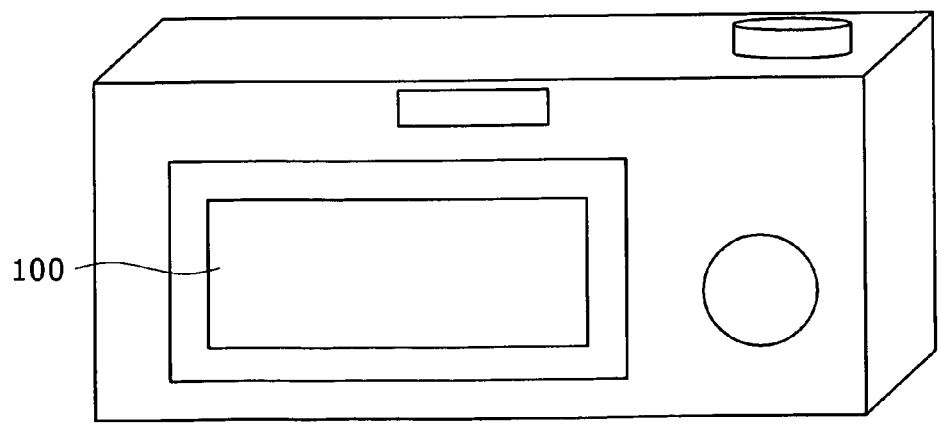

Referring to FIG. 15, the liquid crystal display apparatus 100 can be applied to a digital camera. In the digital camera, the liquid crystal display apparatus 100 is applied as a display apparatus which displays an image such as a picked up image on a display screen thereof and accepts an operation instruction of an operator.

Figure 16:
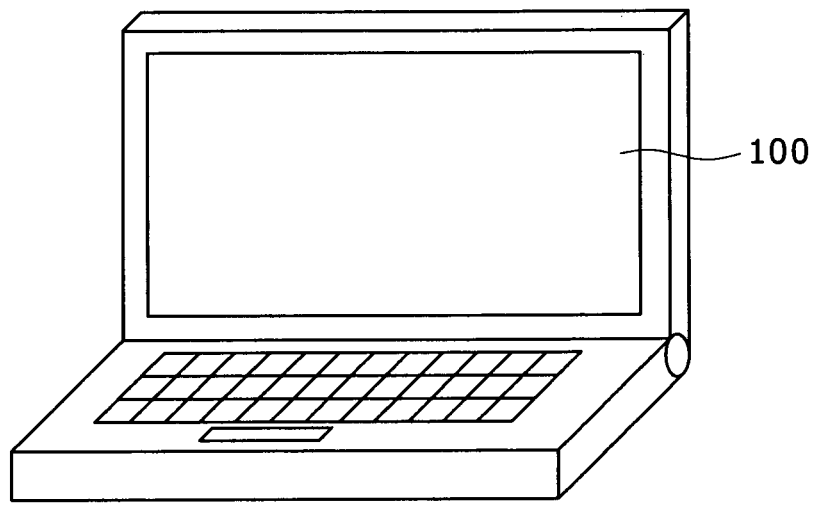

Referring to FIG. 16, the liquid crystal display apparatus 100 can be applied to a personal computer of the laptop type. In the personal computer of the laptop type, the liquid crystal display apparatus 100 is applied as a display apparatus which displays an operation image or the like on a display screen thereof and accepts an operation instruction of an operator.

Figure 17:
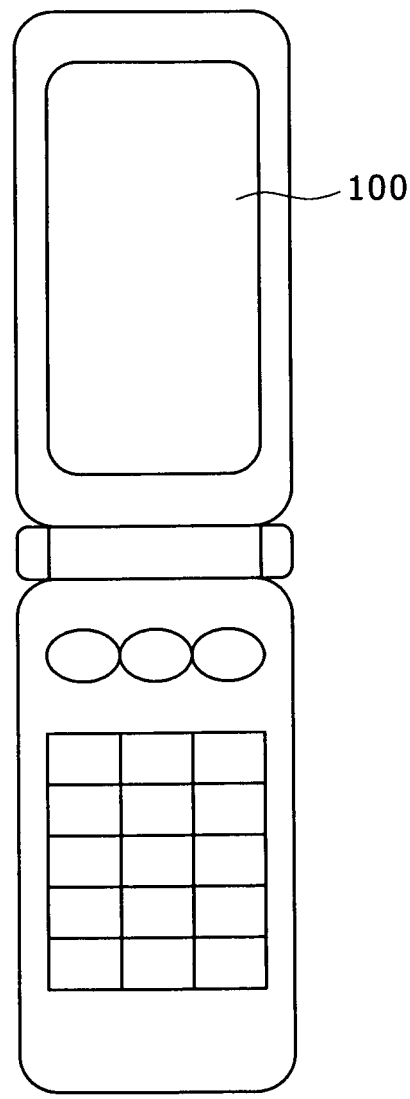

Referring to FIG. 17, the liquid crystal display apparatus 100 can be applied to a portable telephone terminal. In the portable telephone terminal, the liquid crystal display apparatus 100 is applied as a display apparatus which displays an operation image or the like on a display screen thereof and accepts an operation instruction of an operator.

Figure 18:
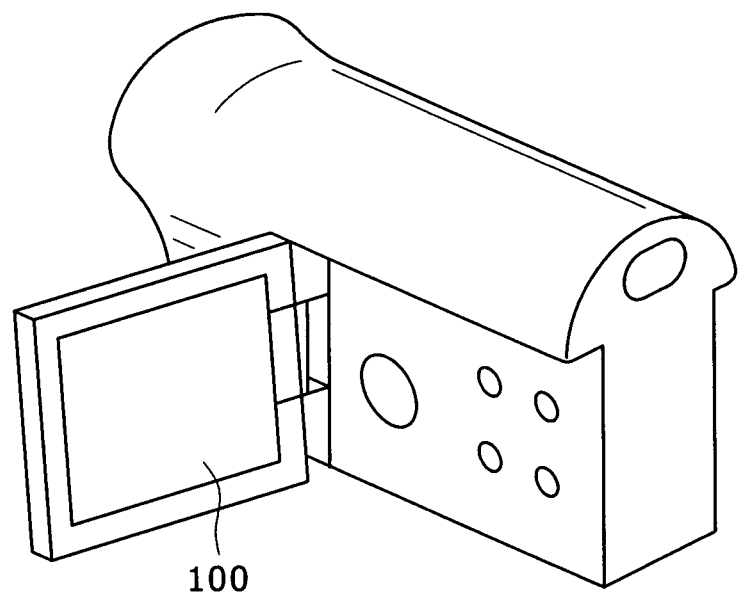

Referring to FIG. 18, the liquid crystal display apparatus 100 can be applied to a video camera. In the video camera, the liquid crystal display apparatus 100 is applied as a display apparatus which displays an operation image or the like on a display screen thereof and accepts an operation instruction of an operator.

Further, in the embodiments described above, the liquid crystal display apparatus 100 is an example of a liquid crystal display apparatus. Similarly, the liquid crystal panels 200, 210, 220 and 230 are each an example of a liquid crystal panel. Similarly, the TFT array substrate 201 is an example of a first substrate. Similarly, the opposing substrate 202 is an example of a second substrate. Similarly, the liquid crystal layer 203 is an example of a liquid crystal layer. Similarly, the first polarizing plate 206 is an example of a first polarizing plate. Similarly, the second polarizing plate 207 is an example of a second polarizing plate. Similarly, the backlight 300 is an example of an illuminating section. Similarly, the pixel P is an example of a pixel. Similarly, the display region PA is an example of a display region. Similarly, the light receiving region SA is an example of a light receiving region. Similarly, the opening 21a is an example of an opening. Similarly, the black matrix layer 21K is an example of a black matrix layer. Similarly, the light receiving element 32 is an example of a light reception element. Similarly, the conductive layer 63 is an example of a conductive layer and a first electrode. Similarly, the conductive layer 64 is an example of a second electrode.

It should be understood by those skilled in the art that various modifications, combinations, sub-combinations and alterations may occur depending on design requirements and other factor in so far as they are within the scope of the appended claims or the equivalents thereof.

What is claimed is:

1. A liquid crystal display apparatus, comprising:
    a liquid crystal panel having a display region for displaying an image and having a plurality of pixels disposed therein; and
    a pair of first and second polarizing plates provided in an opposing relationship to each other through said display region;
    said liquid crystal panel including
        a first substrate,
        a second substrate,
        an illuminating section adjacent to said first substrate, and
        a liquid crystal layer sandwiched by and between said first substrate and said second substrate;
    wherein said liquid crystal panel having a light receiving region in which a light receiving element is formed on a face of said first substrate configured to receive light advancing from said second substrate toward said first substrate,
    said liquid crystal panel being configured such that said plurality of pixels modulate the light irradiated from said illuminating section to display an image in said display region, and
    said pair of first and second polarizing plates and said liquid crystal layer being disposed such that light advancing from said first substrate toward said second substrate is blocked in said light receiving region,
    wherein said liquid crystal panel further includes a black matrix layer formed so as to partition said pixels in the display region and block light;
    said black matrix layer being formed such that an opening through which light is transmitted corresponds to the light receiving region;
    said liquid crystal panel being formed such that light transmitted through the opening formed in said black matrix layer from within the light advancing from said second substrate side toward said first substrate side is received by said light receiving element; and
    said liquid crystal layer being formed such that the light advancing from said first substrate side toward said second substrate side is blocked without being transmitted through the opening formed in said black matrix layer.

2. The liquid crystal display apparatus according to claim 1, wherein said light receiving element is provided on said first substrate so as to receive the light advancing from said second substrate side toward said first substrate side through said liquid crystal layer.

* * * * *